(12) United States Patent
Kenthapadi et al.

(10) Patent No.: US 10,679,187 B2
(45) Date of Patent: Jun. 9, 2020

(54) JOB SEARCH WITH CATEGORIZED RESULTS

(71) Applicant: Microsoft Technology Licensing, LLC, Redmond, WA (US)

(72) Inventors: Krishnaram Kenthapadi, Sunnyvale, CA (US); Kaushik Rangadurai, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 178 days.

(21) Appl. No.: 15/419,174

(22) Filed: Jan. 30, 2017

(65) Prior Publication Data

US 2018/0218326 A1    Aug. 2, 2018

(51) Int. Cl.
*G06Q 10/00* (2012.01)
*G06Q 10/10* (2012.01)
*G06Q 50/00* (2012.01)
*G06F 7/02* (2006.01)
*G06F 16/9535* (2019.01)

(52) U.S. Cl.
CPC ......... *G06Q 10/1053* (2013.01); *G06F 7/026* (2013.01); *G06F 16/9535* (2019.01); *G06Q 50/01* (2013.01)

(58) Field of Classification Search
CPC ............... G06Q 50/01; G06Q 10/1053; G06Q 10/063112; G06Q 10/105; G06Q 10/06311
USPC ........................................ 705/320, 321, 319
See application file for complete search history.

(56) References Cited

U.S. PATENT DOCUMENTS

| | | |
|---|---|---|
| 7,185,065 B1 | 2/2007 | Holtzman et al. |
| 7,818,396 B2 | 10/2010 | Dolin et al. |
| 8,713,000 B1 | 4/2014 | Elman et al. |
| 8,849,813 B1 | 9/2014 | Iyer et al. |
| 8,914,383 B1 | 12/2014 | Weinstein et al. |
| 9,251,470 B2 | 2/2016 | Hua et al. |
| 9,536,226 B2 | 1/2017 | Elman et al. |
| 2003/0220811 A1 | 11/2003 | Fan et al. |
| 2004/0143469 A1 | 7/2004 | Lutz et al. |
| 2004/0219493 A1 | 11/2004 | Phillips |

(Continued)

OTHER PUBLICATIONS

"2012-2013 Student Internship/Co-op arid Full-Time Outcome Report", Retrieved from: https://cdn.uconnectlabs.com/wp-content/uploads/sites/15/2016/05/StudentOutcomes20122013Final.pdf, 2013, 11 Pages.

(Continued)

*Primary Examiner* — Gabrielle A Mccormick
(74) *Attorney, Agent, or Firm* — Schwegman Lundberg & Woessner, P.A.

(57) ABSTRACT

Methods, systems, and computer programs are presented for grouping job postings for presentation to a user in response to a search. A method includes determining the closest-matching groups of jobs for a user and presenting a display such that the closest-matching jobs are viewable within the groups. For each group, a server determines a group affinity based on a group characteristic and a user characteristic and affinities of jobs for that group based on the job postings and the group characteristic. The server ranks the groups for the user based on the group affinity score for each group, and ranks the job postings within each group based on the jobs affinity to the user. Some of the groups and job postings are presented to the user based on the ranking.

10 Claims, 15 Drawing Sheets

(56) References Cited

U.S. PATENT DOCUMENTS

| | | | |
|---|---|---|---|
| 2004/0243560 A1 | 12/2004 | Broder et al. | |
| 2006/0004869 A1 | 1/2006 | Yuster et al. | |
| 2006/0042483 A1 | 3/2006 | Work et al. | |
| 2006/0229896 A1 | 10/2006 | Rosen et al. | |
| 2006/0229902 A1* | 10/2006 | McGovern | G06Q 10/06 705/321 |
| 2006/0265258 A1 | 11/2006 | Powell et al. | |
| 2007/0288308 A1 | 12/2007 | Chen et al. | |
| 2008/0115173 A1* | 5/2008 | Ellis | H04N 21/4312 725/61 |
| 2008/0140656 A1* | 6/2008 | Panda | G06Q 10/06 |
| 2008/0243637 A1* | 10/2008 | Chan | G06Q 30/02 705/26.1 |
| 2009/0222430 A1* | 9/2009 | Hobson | G06F 16/437 |
| 2010/0057659 A1 | 3/2010 | Phelon et al. | |
| 2010/0324970 A1* | 12/2010 | Phelon | G06F 17/30867 705/321 |
| 2010/0332405 A1 | 12/2010 | Williams | |
| 2011/0184958 A1 | 7/2011 | Krishnamoorthy et al. | |
| 2011/0238591 A1 | 9/2011 | Kerr et al. | |
| 2012/0197863 A1 | 8/2012 | Skomoroch et al. | |
| 2013/0013526 A1 | 1/2013 | Le Viet et al. | |
| 2013/0110593 A1 | 5/2013 | Fowler | |
| 2013/0124474 A1 | 5/2013 | Anderson | |
| 2013/0138588 A1 | 5/2013 | Mehta et al. | |
| 2013/0166358 A1 | 6/2013 | Parmar et al. | |
| 2013/0198099 A1 | 8/2013 | Hyder et al. | |
| 2013/0290205 A1 | 10/2013 | Bonmassar et al. | |
| 2013/0297373 A1 | 11/2013 | Proux | |
| 2014/0025748 A1 | 1/2014 | Mallet et al. | |
| 2014/0122355 A1 | 5/2014 | Hardtke et al. | |
| 2014/0129460 A1* | 5/2014 | Budzienski | G06Q 50/01 705/321 |
| 2014/0136434 A1 | 5/2014 | Posse et al. | |
| 2014/0143165 A1 | 5/2014 | Posse et al. | |
| 2014/0164994 A1 | 6/2014 | Myslinski | |
| 2014/0188681 A1 | 7/2014 | Shahghasemi | |
| 2014/0214943 A1 | 7/2014 | Shapero et al. | |
| 2014/0214945 A1 | 7/2014 | Zhang et al. | |
| 2014/0237046 A1 | 8/2014 | Brooks et al. | |
| 2014/0244335 A1 | 8/2014 | Baldwin et al. | |
| 2014/0244520 A1 | 8/2014 | Wurtele et al. | |
| 2014/0244530 A1 | 8/2014 | Baldwin et al. | |
| 2014/0244531 A1 | 8/2014 | Baldwin et al. | |
| 2014/0258288 A1 | 9/2014 | Work et al. | |
| 2014/0279629 A1 | 9/2014 | Mcconnell | |
| 2015/0006422 A1 | 1/2015 | Carter et al. | |
| 2015/0019640 A1 | 1/2015 | Li et al. | |
| 2015/0046353 A1 | 2/2015 | Elman et al. | |
| 2015/0046356 A1 | 2/2015 | Millmore et al. | |
| 2015/0100510 A1* | 4/2015 | Sachdev | G06Q 10/1053 705/321 |
| 2015/0120717 A1 | 4/2015 | Kim et al. | |
| 2015/0127400 A1 | 5/2015 | Chan et al. | |
| 2015/0127565 A1 | 5/2015 | Chevalier et al. | |
| 2015/0220880 A1 | 8/2015 | Maipady et al. | |
| 2015/0248648 A1 | 9/2015 | Rao | |
| 2015/0278960 A1 | 10/2015 | Moore et al. | |
| 2015/0287051 A1 | 10/2015 | Baig et al. | |
| 2015/0317753 A1 | 11/2015 | Goel et al. | |
| 2015/0317759 A1 | 11/2015 | Jing et al. | |
| 2015/0317760 A1 | 11/2015 | Pham | |
| 2015/0339938 A1 | 11/2015 | Sampath | |
| 2015/0347606 A1 | 12/2015 | Goel et al. | |
| 2015/0370798 A1* | 12/2015 | Ju | G06F 17/30867 707/748 |
| 2016/0034853 A1 | 2/2016 | Wang et al. | |
| 2016/0055159 A1* | 2/2016 | Connolly | G06F 16/24578 707/734 |
| 2016/0098683 A1 | 4/2016 | Angulo et al. | |
| 2016/0191450 A1* | 6/2016 | Lineberger | G06Q 50/01 709/206 |
| 2016/0267522 A1 | 9/2016 | Schellenberger et al. | |
| 2016/0292643 A1 | 10/2016 | Rodriguez et al. | |
| 2016/0314200 A1 | 10/2016 | Markman et al. | |
| 2016/0321362 A1 | 11/2016 | Lytkin et al. | |
| 2016/0343005 A1 | 11/2016 | Liu et al. | |
| 2016/0379170 A1 | 12/2016 | Pande | |
| 2017/0004454 A1* | 1/2017 | Tang | G06F 16/9535 |
| 2017/0032386 A1 | 2/2017 | Borza | |
| 2017/0046439 A1* | 2/2017 | Gellis | G06Q 50/01 |
| 2017/0109850 A1 | 4/2017 | Chetlur et al. | |
| 2017/0236095 A1 | 8/2017 | Schreiber et al. | |
| 2017/0249594 A1 | 8/2017 | Ortigas et al. | |
| 2017/0255997 A1 | 9/2017 | Watson | |
| 2017/0270456 A1 | 9/2017 | Branagh et al. | |
| 2017/0301040 A1 | 10/2017 | Scafaria | |
| 2018/0068271 A1 | 3/2018 | Abebe et al. | |
| 2018/0173804 A1 | 6/2018 | Kenthapadi et al. | |
| 2018/0174105 A1 | 6/2018 | Kenthapadi et al. | |
| 2018/0174106 A1 | 6/2018 | Kenthapadi et al. | |
| 2018/0189739 A1 | 7/2018 | Kenthapadi et al. | |
| 2018/0218327 A1 | 8/2018 | Kenthapadi et al. | |
| 2018/0218328 A1 | 8/2018 | Kenthapadi et al. | |
| 2018/0225632 A1 | 8/2018 | Kenthapadi et al. | |
| 2018/0225633 A1 | 8/2018 | Kenthapadi et al. | |
| 2018/0232751 A1 | 8/2018 | Terhark et al. | |
| 2018/0240071 A1 | 8/2018 | Kenthapadi et al. | |
| 2018/0285822 A1 | 10/2018 | Kenthapadi et al. | |
| 2018/0285823 A1 | 10/2018 | Kenthapadi et al. | |
| 2018/0285824 A1 | 10/2018 | Kenthapadi et al. | |
| 2018/0315019 A1 | 11/2018 | Kenthapadi et al. | |

OTHER PUBLICATIONS

"Applicant Initiated Interview Summary Issued in U.S. Appl. No. 15/379,624", dated Apr. 26, 2019, 4 Pages.

"Non Final Office Action Issued in U.S. Appl. No. 15/379,624", dated Jan. 31, 2019, 40 Pages.

"Non Final Office Action Issued in U.S. Appl. No. 15/379,676", dated Jan. 25, 2019, 35 Pages.

"Applicant Initiated Interview Summary Issued in U.S. Appl. No. 15/379,686", dated Apr. 26, 2019, 4 Pages.

"Non Final Office Action Issued in U.S. Appl. No. 15/379,686", dated Jan. 24, 2019, 37 Pages.

"Applicant Interview Summary Issued in U.S. Appl. No. 15/419,231", dated Apr. 26, 2019, 3 Pages.

"Non Final Office Action Issued in U.S. Appl. No. 15/419,231", dated Jan. 18, 2018, 12 Pages.

"Non Final Office Action Issued in U.S. Appl. No. 15/424,051", dated Feb. 8, 2019, 25 Pages.

"Non Final Office Action Issued in U.S. Appl. No. 15/424,082", dated Mar. 21, 2019, 31 Pages.

"Applicant Interview Summary Issued in U.S. Appl. No. 15/478,802", dated Mar. 1, 2019, 3 Pages.

"Non Final Office Action Issued in U.S. Appl. No. 15/478,802", dated Nov. 28, 2018, 15 Pages.

"Applicant Initiated Interview Summary Issued in U.S. Appl. No. 15/478,821", dated Apr. 1, 2019, 3 Pages.

"Non Final Office Action Issued in U.S. Appl. No. 15/478,821", dated Dec. 27, 2019, Dec. 27, 2019, 13 Pages.

Fitzpatrick, et al., "Forming effective worker teams with multi-functional skill requirements", In journal of Computers & Industrial Engineering, vol. 48, Issue 1, May 2005, pp. 593-608.

Wheelan, Susan A., "Group Size, Group Development, and Group Productivity", In SAGE Publications, vol. 40, Issue 2, Apr. 2009, pp. 247-262.

"U.S. Appl. No. 15/379,624, Non Final Office Action dated Sep. 30, 2019", 42 pgs.

"U.S. Appl. No. 15/379,624, Response filed May 29, 2019 to Non-Final Office Action dated Jan. 31, 2019", 15 pgs.

"U.S. Appl. No. 15/379,676, Examiner Interview Summary dated May 21, 2019", 4 pgs.

"U.S. Appl. No. 15/379,676, Final Office Action dated Jul. 30, 2019", 51 pgs.

"U.S. Appl. No. 15/379,676, Response filed Oct. 30, 2019 to Final Office Action dated Jul. 30, 2019", 20 pgs.

(56) References Cited

OTHER PUBLICATIONS

"U.S. Appl. No. 15/379,676, Response filed May 21, 2019 to Non Final Office Action dated Jan. 25, 2019", 17 pgs.

"U.S. Appl. No. 15/379,686, Examiner Interview Summary dated Nov. 22, 2019", 3 pgs.

"U.S. Appl. No. 15/379,686, Final Office Action dated Aug. 14, 2019", 42 pgs.

"U.S. Appl. No. 15/379,686, Response filed Nov. 13, 2019 to Final Office Action dated Aug. 14, 2019", 17 pgs.

"U.S. Appl. No. 15/419,231, Final Office Action dated Aug. 7, 2019", 14 pgs.

"U.S. Appl. No. 15/424,051, Non Final Office Action dated Oct. 21, 2019", 41 pgs.

"U.S. Appl. No. 15/424,051, Response filed Jul. 8, 2019 to Non Final Office Action dated Feb. 8, 2019", 16 pgs.

"U.S. Appl. No. 15/424,082, Final Office Action dated Jan. 3, 2020", 45 pgs.

"U.S. Appl. No. 15/424,082, Response filed Sep. 23, 2019 to Non-Final Office Action dated Mar. 21, 2019", 14 pgs.

"U.S. Appl. No. 15/437,649, Non Final Office Action dated Sep. 9, 2019", 36 pgs.

"U.S. Appl. No. 15/437,649, Response filed Dec. 9, 2019 to Non Final Office Action dated Sep. 9, 2019", 18 pgs.

"U.S. Appl. No. 15/478,802, Final Office Action dated May 21, 2019", 16 pgs.

"U.S. Appl. No. 15/478,802, Non Final Office Action dated Nov. 13, 2019", 17 pgs.

"U.S. Appl. No. 15/478,802, Response filed Oct. 21, 2019 to Final Office Action dated May 21, 2019", 17 pgs.

"U.S. Appl. No. 15/478,821, Final Office Action dated May 22, 2019", 14 pgs.

"U.S. Appl. No. 15/478,821, Notice of Allowance dated Dec. 30, 2019", 10 pgs.

"U.S. Appl. No. 15/478,821, Response filed Oct. 22, 2019 to Final Office Action dated May 22, 2019", 15 pgs.

"U.S. Appl. No. 15/478,843, Final Office Action dated Oct. 10, 2019", 15 pgs.

"U.S. Appl. No. 15/478,843, Non Final Office Action dated May 9, 2019", 11 pgs.

"U.S. Appl. No. 15/478,843, Response filed Sep. 9, 2019 to Non-Final Office Action dated May 9, 2019", 15 pgs.

"U.S. Appl. No. 15/499,594, Non Final Office Action dated Aug. 2, 2019", 14 pgs.

"U.S. Appl. No. 15/499,594, Response filed Nov. 4, 2019 to Non Final Office Action dated Aug. 2, 2019", 21 pgs.

Kapur, Navneet, et al.; "Ranking Universities Based on Career Outcomes of Graduates, KDD", 16 Proceedings of the 22nd ACM SIGKDD International Conference on Knowledge Discovery and Data Mining, [Online] Retrieved from the internet: <https://dl.acm.org/citation.cfm?id=2939701>, (Aug. 17, 2016), 137-144.

\* cited by examiner

JOB SEARCH WITH CATEGORIZED RESULTS

TECHNICAL FIELD

The subject matter disclosed herein generally relates to methods, systems, and programs for finding quality job offerings for a member of a social network.

BACKGROUND

Some social networks provide job postings to their members. The member may perform a job search by entering a job search query, or the social network may suggest jobs that may be of interest to the member. However, current job search methods may miss valuable opportunities for a member because the job search engine limits the search to specific parameters. For example, the job search engine may look for matches of a job in the title to the member's title, but there may be quality jobs that are associated with a different title that would be of interest to the member.

Further, existing job search methods may focus only on the job description or the member's profile, without considering the member's preferences for job searches that go beyond the job description or other information that may help find the best job postings for the member.

BRIEF DESCRIPTION OF THE DRAWINGS

Various ones of the appended drawings merely illustrate example embodiments of the present disclosure and cannot be considered as limiting its scope.

DETAILED DESCRIPTION

Figure 1:
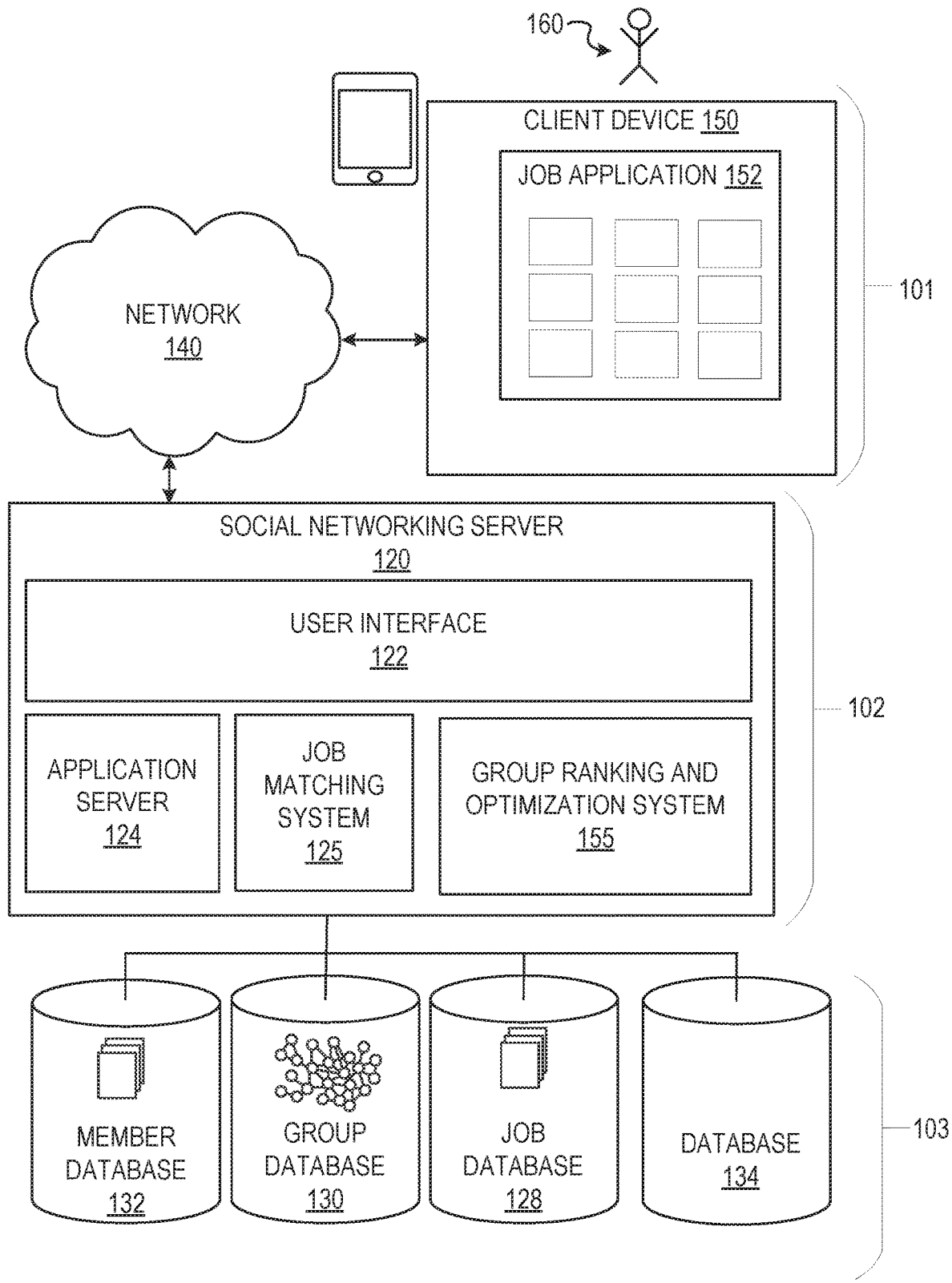
FIG. 1 is a block diagram illustrating a network architecture, according to some example embodiments, including a social networking server.

Example methods, systems, and computer programs are directed to grouping job postings for presentation to a user in response to a search. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

One of the goals of the present embodiments is to personalize and redefine how job postings are searched and presented to job seekers. Another goal is to explain better why particular candidate jobs are recommended to the job seekers. The presented embodiments provide both active and passive job seekers with valuable job recommendation insights, thereby greatly improving their ability to find and assess jobs that meet their needs.

Instead of providing a single job recommendation list for a member, embodiments presented herein define a plurality of groups, and the job recommendations are presented within the groups. Each group provides an indication of a feature that is important to the member for selecting from the group, such as how many people have transitioned from the university of the member to the company of the job, who would be a virtual team for the member if the member joined the company, etc. Thus, the embodiments are able to provide insight into the methods of job selection to the user by providing groups of jobs, with all jobs in the group sharing one or more features. Thus, the user is given insight into why certain jobs are presented within a particular group.

Embodiments presented herein compare jobs, groups, and members to determine a personalized display of groups to a member that best conforms with the member's employment interests. Further, additional embodiments presented herein compare jobs, groups, and member relations to determine an optimal representation of jobs within groups, such that the jobs most relevant to the group and to the member are presented to the member.

One general aspect includes a method for detecting, by a server having one or more processors, a job search for a member of a social network. A search for a user may be physically initiated by a user or initiated by a system on behalf of a user in order to automatically provide results (e.g. by email or responsive to a user logging into the social network). The method also includes performing the job search to obtain a plurality of candidate jobs for presentation to the user, each candidate job having a job affinity score. The job affinity score identifies a matching degree between the job and the member. The method also includes operations for identifying a plurality of groups, each group including a characteristic for identifying which jobs belong to the group. The method determines if each candidate job belongs to each group based on a job-to-group score that measures how the job matches the characteristic of the respective group. The method assigns a group affinity score that measures a value of the group to the member. The method also includes operations for ranking the groups for presentation to the member based on the group affinity scores and for causing presentation of a predetermined number of groups in a user interface of the member.

In some embodiments, ranking the groups for presentation includes basing the ranking on a combined affinity score between each group and the member. The combined affinity score for each group being based on group affinity score, the job-to-group scores between jobs within the group and the group, and the job affinity scores between the jobs within the group and the member. In further embodiments, the ranking of a group is further based on a number of jobs within the group having a job-to-group score that transgresses a predetermined job-to-group threshold score. In further embodiments, the combined affinity score is based on a global affinity score that is determined by tracking a number of members interacting with the group, and further whether a global affinity score is transgressed by the number of members engaging in member interactions with the group.

In some embodiments, the ranking of the groups if further based on the quantity (liquidity) of jobs available for presentation within the group to the member. The ranking can further be based on whether the liquidity of jobs within the group transgresses a threshold quantity of jobs.

In some embodiments, operations of the method further include transmitting instructions to display a favorite option within each group within the display and receiving a selection of the favorite option. In further embodiments, the ranking of groups for presentation to the member is based on which groups have the favorite group status.

One general aspect includes a method for performing, by one or more processors, a job search for a member of the social network that results in a plurality of jobs. The method also includes operations to identify a plurality of groups for presenting to the member. This identification may be based on a group affinity score that measures a value to the member of the group. The method also includes operations to determine a job-to-group score between each job and each group that measures how each job matches each group. The method further includes operations to rank the jobs for presentation within each group based on the job-to-group scores. The method further includes operations to detect that a first job is to be presented in two or more groups based on the ranking and operations to determine a first group as a presenting group for the first job based on the job-to-group scores and the affinity scores. The method finally includes operations to cause presentation of the plurality of groups to a user interface of the member.

In some embodiments, the determining of the first group as a presenting group from two or more of the groups for presentation is further based on a maximum number of jobs presentable within each group or a rank of the first job within each of the two or more groups. In some embodiments, the ranking of the jobs for presentation within each group is further based on a job affinity score that identifies a degree of matching between the job and the member.

In some embodiments, the method further includes operations to identify a second group from the two or more groups for presentation of the first job based on the job-to-group score and affinity score and to further cause presentation of the job within the first group and within the second group.

In some embodiments, the method further includes operations to access a presentation threshold that identifies a minimum group affinity for the presenting group and further includes operations to determine which jobs within the group have a group affinity score exceeding the presentation threshold. In further embodiments, a ranking threshold is similarly accessed that identifies a minimum job-to-group score for presenting a job within a group and further includes operations to determine which jobs within the group have a job-to-group score exceeding the minimum job-to-group score. In some embodiments the ranking of the jobs for presentation further includes determining whether a member has engaged in an interaction with one or more of the jobs.

In some embodiments, the method includes receiving a member indication on a user interface that comprises a selection by the member to search for jobs. In further embodiments, the method includes determining a global affinity score for each group as part of detecting whether the first job is to be presented within two or more groups. The global affinity score is determined by tracking a number of members engaging in member interactions with the group, and further whether the number of members engaging in member interactions with the group transgresses a global affinity threshold.

FIG. 1 is a block diagram illustrating a network architecture, according to some example embodiments, including a social networking server 120. As shown in FIG. 1, the data layer 103 includes several databases, including a member database 132 for storing data for various entities of the social networking server 120, including member profiles, company profiles, and educational institution profiles, as well as information concerning various online or offline groups. Of course, in various alternative embodiments, any number of other entities might be included in the social graph, and as such, various other databases may be used to store data corresponding with other entities.

Consistent with some embodiments, when a person initially registers to become a member of the social networking server 120, the person will be prompted to provide some personal information, such as his or her name, age (e.g., birth date), gender, interests, contact information, home town, address, spouse's and/or family members' names, educational background (e.g., schools, majors, etc.), current job title, job description, industry, employment history, skills, professional organizations, interests, and so on. This information is stored, for example, as member attributes in the member database 132.

Additionally, the data layer 103 includes a job database 128 for storing job data. The job data includes information collected from a company offering a job, including experience required, location, duties, pay, and other information. This information is stored, for example, as job attributes in the job database 128.

Once registered, a member may invite other members, or be invited by other members, to connect via the social networking server 120. A "connection" may specify a bilateral agreement by the members, such that both members acknowledge the establishment of the connection. Similarly, in some embodiments, a member may elect to "follow" another member. In contrast to establishing a connection, the concept of "following" another member typically is a unilateral operation, and at least in some embodiments, does not prompt acknowledgement or approval by the member who is being followed. When one member connects with or follows another member, the member who is connected to or following the other member may receive messages or updates (e.g., content items) in his or her personalized content stream about various activities undertaken by the other member. More specifically, the messages or updates presented in the content stream may be authored and/or published or shared by the other member, or may be automatically generated based on some activity or event involving the other member. In addition to following another member, a member may elect to follow a company, a topic, a conversation, a web page, or some other entity or object, which may or may not be included in the social graph maintained by the social networking server 120. In some example embodiments, because the content selection algorithm selects content relating to or associated with the particular entities that a member is connected with or is following, as a member connects with and/or follows other entities, the universe of available content items for presentation to the member in his or her content stream increases.

Additionally, the data layer 103 includes a group database 130 for storing group data. The group database 130 includes information about groups (e.g., clusters) of jobs that have job attributes in common with each other. The group data includes various group features comprising a characteristic for the group, as discussed in more detail below. This information is stored, for example, as job attributes in the job database 128.

As members interact with various applications, content, and user interfaces of the social networking server 120, information relating to the member's activity and behavior may be stored in a database, such as the member database 132 and the job database 128.

The social networking server 120 may provide a broad range of other applications and services that allow members the opportunity to share and receive information, often customized to the interests of the member. In some embodiments, members of the social networking server 120 may be able to self-organize into groups, or interest groups, organized around a subject matter or a topic of interest. In some embodiments, members may subscribe to or join groups affiliated with one or more companies. For instance, in some embodiments, members of the social networking server 120 may indicate an affiliation with a company at which they are employed, such that news and events pertaining to the company are automatically communicated to the members in their personalized activity or content streams. In some embodiments, members may be allowed to subscribe to receive information concerning companies other than the company with which they are employed. Membership in a group, a subscription or following relationship with a company or group, and an employment relationship with a company are all examples of different types of relationship that may exist between different entities, as defined by the social graph and modeled with social graph data of the member database 132.

The application logic layer 102 includes various application server modules 124, which, in conjunction with a user interface module 122, generate various user interfaces with data retrieved from various data sources or data services in the data layer 103. In some embodiments, individual application server modules 124 are used to implement the functionality associated with various applications, services, and features of the social networking server 120. For instance, a messaging application, such as an email application, an instant messaging application, or some hybrid or variation of the two, may be implemented with one or more application server modules 124. A photo sharing application may be implemented with one or more application server modules 124. Similarly, a search engine enabling users to search for and browse member profiles may be implemented with one or more application server modules 124. Of course, other applications and services may be separately embodied in their own application server modules 124. As illustrated in FIG. 1, the social networking server 120 may include a job matching system 125, which creates a job display on the job application 152 that is displayed within the job application 152 on the client device 150. Also included in the social networking server 120 is a group ranking and optimization system 155, which causes the job application 152 to display personalized groups that include job postings viewable by the searching member 160.

Figure 2:
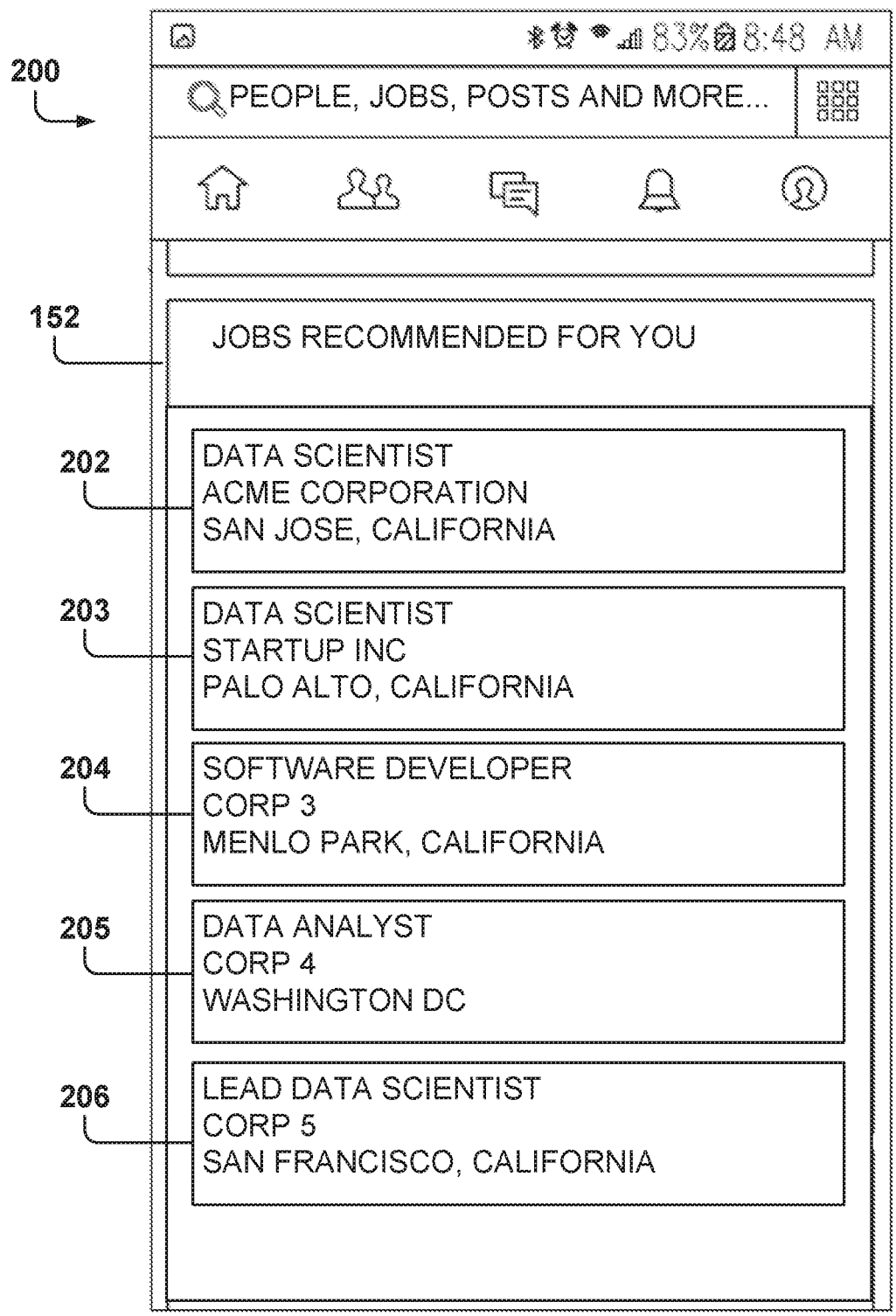
FIG. 2 is a screenshot of a user interface that includes job recommendations, according to some example embodiments.

FIG. 2 is a screenshot of a user interface 200 that includes recommendations for jobs 202-206 within the job application 152, according to some example embodiments. In one example embodiment, the social network user interface provides job recommendations, which are job postings that match the job interests of the user and that are presented without a specific job search request from the user (e.g., job suggestions).

In another example embodiment, a job search interface is provided for entering job searches, and the resulting job matches are presented to the user in the user interface 200.

As the user scrolls down the user interface 200, more job recommendations are presented to the user. In some example embodiments, the job recommendations are prioritized to present jobs in an estimated order of interest to the user.

The user interface 200 presents a "flat" list of job recommendations as a single list. Other embodiments presented below utilize a "segmented" list of job recommendations where each segment is a group that is associated with a related reason indicating why these jobs are being recommended within the group.

Figure 3:
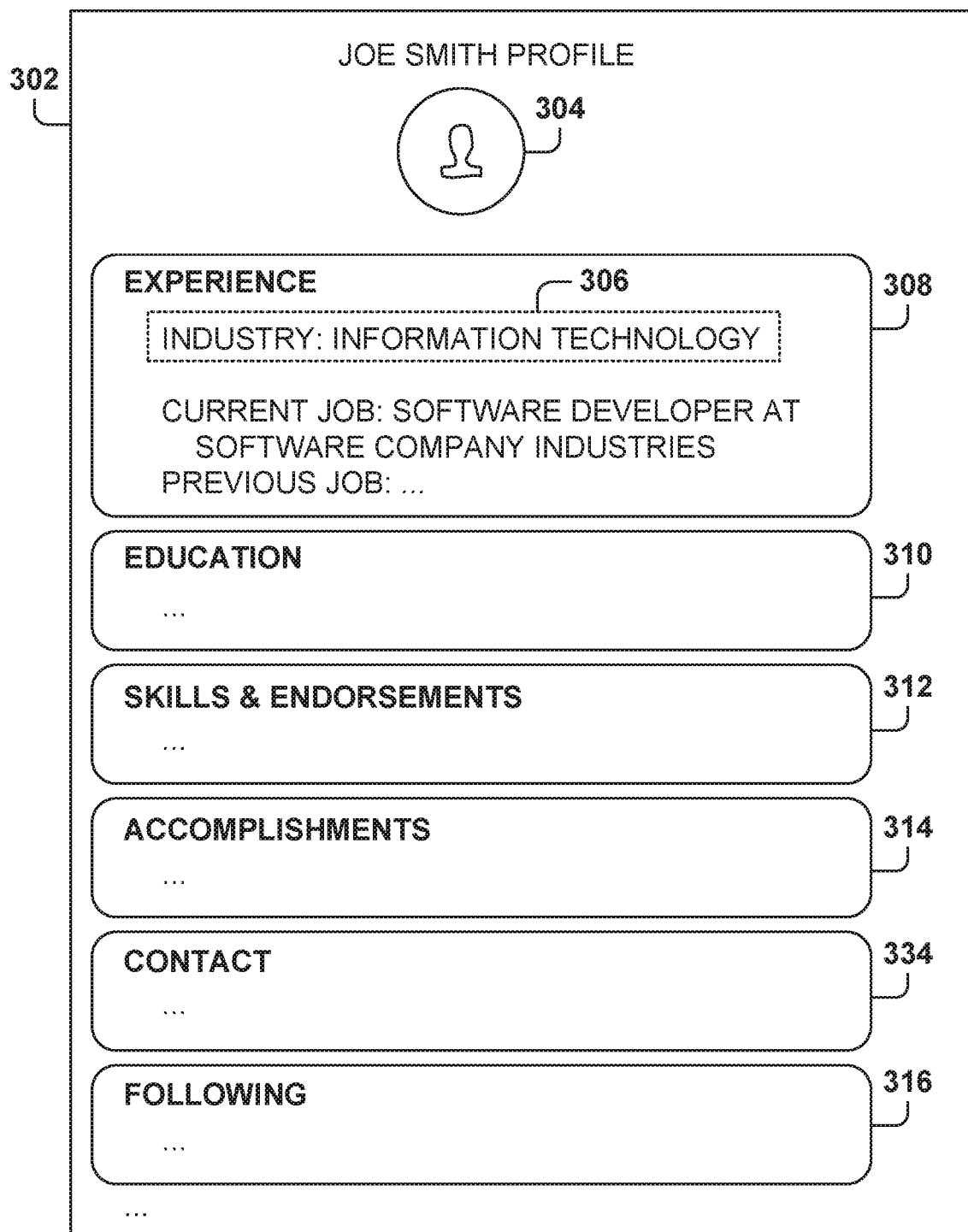
FIG. 3 is a screenshot of a user's profile view, according to some example embodiments.

FIG. 3 is a screenshot of a user's profile view, according to some example embodiments. Each user in the social network has a member profile 302, which includes information about the user. The member profile 302 is configurable by the user and also includes information based on the user's activity in the social network (e.g., likes, posts read).

In one example embodiment, the member profile 302 may include information in several categories, such as a profile picture 304, experience 308, education 310, skills and endorsements 312, accomplishments 314, contact information 334, following 316, and the like. Skills include professional competences that the member has, and the skills may be added by the member or by other members of the social network. Example skills include C++, Java, Object Programming, Data Mining, Machine Learning, Data Scientist, and the like. Other members of the social network may endorse one or more of the skills and, in some example embodiments, the member's account is associated with the number of endorsements received for each skill from other members.

The experience 308 information includes information related to the professional experience of the user. In one example embodiment, the experience 308 information includes an industry 306, which identifies the industry in which the user works. In one example embodiment, the user is given an option to select an industry 306 from a plurality of industries when entering this value in the member profile 302. The experience 308 information area may also include information about the current job and previous jobs held by the user.

The education 310 information includes information about the educational background of the user, including the educational institutions attended by the user, the degrees obtained, and the field of study of the degrees. For example, a member may list that the member attended the University of Michigan and obtained a graduate degree in computer science. For simplicity of description, the embodiments presented herein are presented with reference to universities as the educational institutions, but the same principles may be applied to other types of educational institutions, such as high schools, trade schools, professional training schools, etc.

The skills and endorsements 312 information includes information about professional skills that the user has identified as having been acquired by the user, and endorsements entered by other users of the social network supporting the skills of the user. The accomplishments 314 area includes accomplishments entered by the user, and the contact information 334 includes contact information for the user, such as an email address and phone number. The following 316 area includes the names of entities in the social network being followed by the user.

Figure 4:
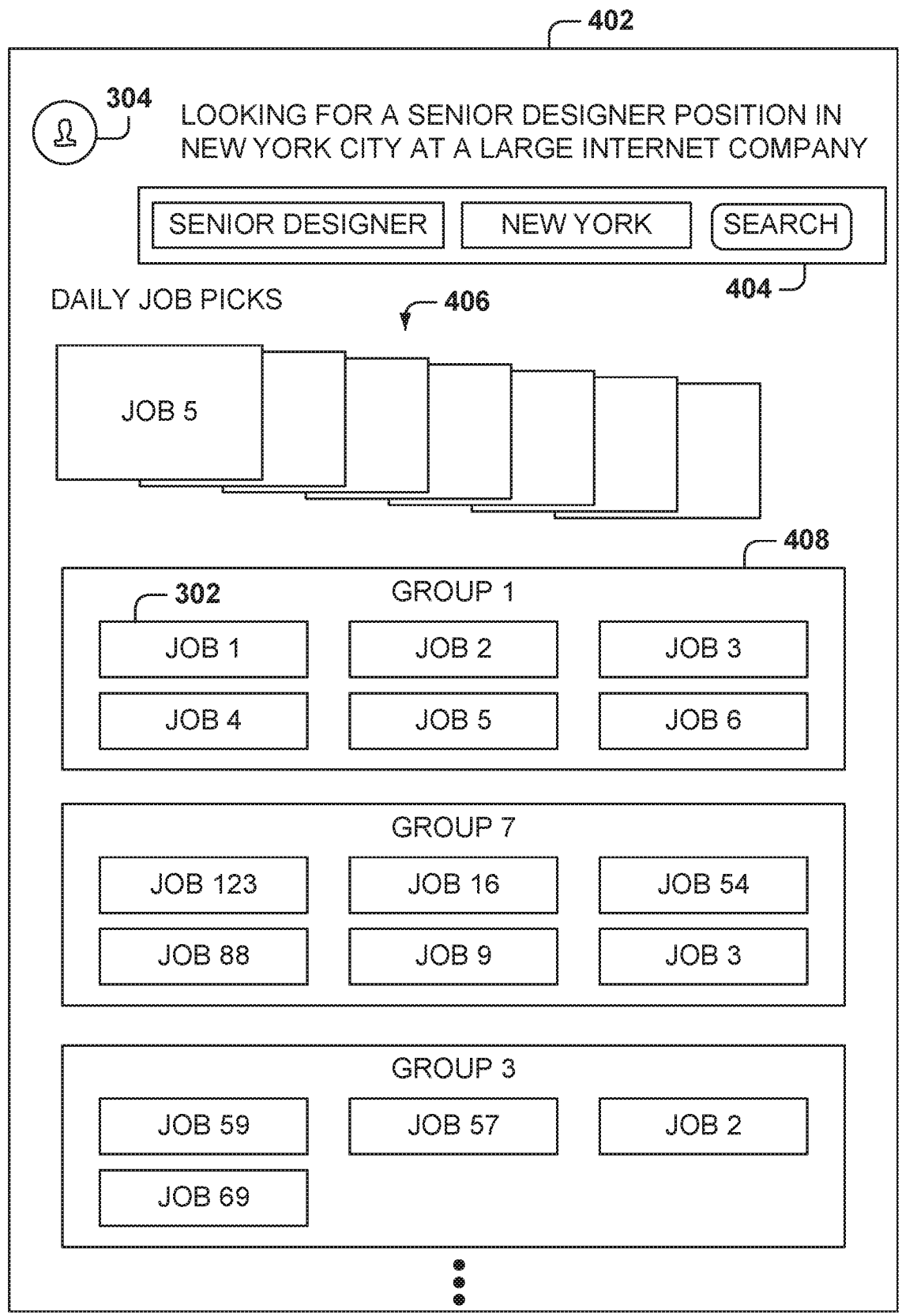
FIG. 4 is a diagram of a user interface, according to some example embodiments, for presenting job postings to a member of a social network.

FIG. 4 is a diagram of a user interface 402, according to some example embodiments, for presenting job postings to a member of the social network. The user interface 402 includes the profile picture 304 of the member, a search section 404, a daily jobs section 406, and one or more group areas 408. In some example embodiments, a message next to the profile picture 304 indicates the goal of the search, e.g., "Looking for a senior designer position in New York City at a large Internet company."

The search section 404, in some example embodiments, includes two boxes for entering search parameters: a keyword input box for entering any type of keywords for the search (e.g., job title, company name, job description, skill, etc.), and a geographic area input box for entering a geographic area for the search (e.g., New York). This allows members to execute searches based on keyword and location. In some embodiments, the geographic area input box includes one or more of city, state, ZIP code, or any combination thereof.

In some example embodiments, the search boxes may be prefilled with the user's title and location if no search has been entered yet. Clicking the search button causes the search of jobs based on the keyword inputs and location. It is to be noted that the inputs are optional, and only one search input may be entered at a time, or both search boxes maybe filled in.

The daily jobs section 406 includes information about one or more jobs selected for the user, based on one or more parameters, such as member profile data, search history, job match to the member, recentness of the job, whether the user is following the job, etc.

Each group area 408 includes one or more jobs 202 for presentation in the user interface 402. In one example embodiment, the group area 408 includes one to six jobs 202 with an option to scroll the group area 408 to present additional jobs 202, if available. The jobs 202 in this interface may be automatically filled based on a search on behalf of the searching member 106.

Each group area 408 provides an indication of why the member is being presented with those jobs, which identifies the characteristic of the group. There could be several types of reasons related to the connection of the user to the job, the affinity of the member to the group, the desirability of the job, or the time deadline of the job (e.g., urgency). The reasons related to the connection of the user to the job may include relationships between the job and the social connections of the member (e.g., "Your connections can refer you to this set of jobs"), a quality of a fit between the job and the user characteristics (e.g., "This is a job from a company that hires from our school"), a quality of a match between the member's talent and the job (e.g., "You would be in the top 90% of all applicants), etc.

Further, the group characteristics may be implicit (e.g., "These jobs are recommended based on your browsing history") or explicit (e.g., "These are jobs from companies you followed"). The desirability reasons may include popularity of the job in the member's area (e.g., most-viewed by other members or most applications received), jobs from in-demand start-ups in the member's area, and popularity of the job among people with the same title as the member. Further yet, the time-urgency reasons may include "Be the first to apply to these jobs," or "These jobs will be expiring soon."

It is to be noted that the embodiments illustrated in FIG. 4 are examples and do not describe every possible embodiment. Other embodiments may utilize different layouts or groups, present fewer or more jobs, present fewer or more groups, etc. The embodiments illustrated in FIG. 4 should therefore not be interpreted to be exclusive or limiting, but rather illustrative.

Figure 5:
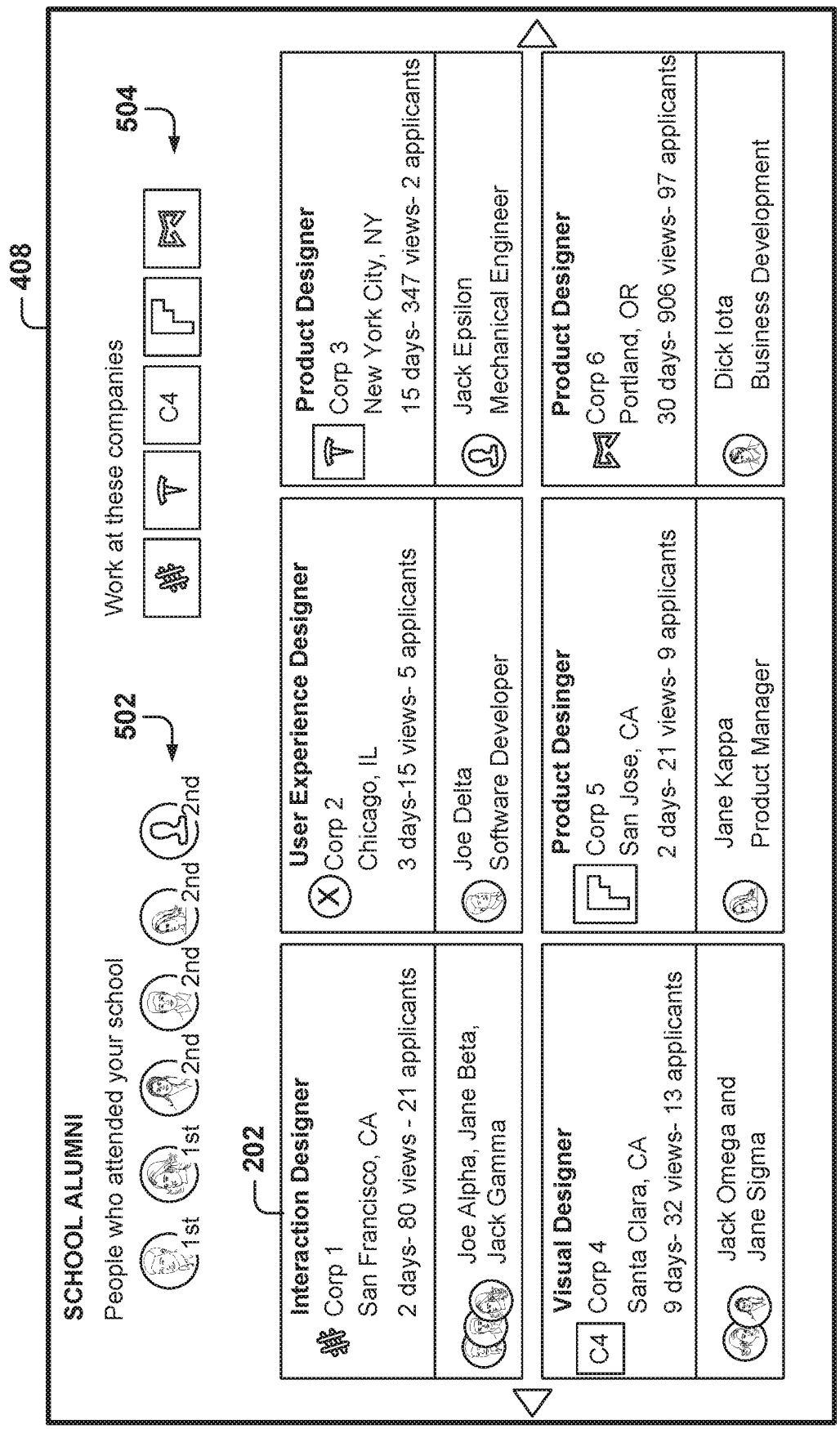
FIG. 5 is a detail of a group area in the user interface of FIG. 4, according to some example embodiments.

FIG. 5 is a detail of the group area 408 in the user interface, according to some example embodiments. In one example embodiment, the group area 408 includes recommendations of jobs 202, which provide information about one or more jobs. For example, the information about the job includes the title of the job, the company offering the job activity from other members (number of views, number of applicants), the location of the job, other members in the searching member's 160 social network that are affiliated with the job, or the company offering the job. In one example embodiment, the group area 408 includes profile pictures 502 of people who attended the same educational institution, also referred to herein as school or university, as the member, and further displays the companies 504 these people work for.

Figure 6:
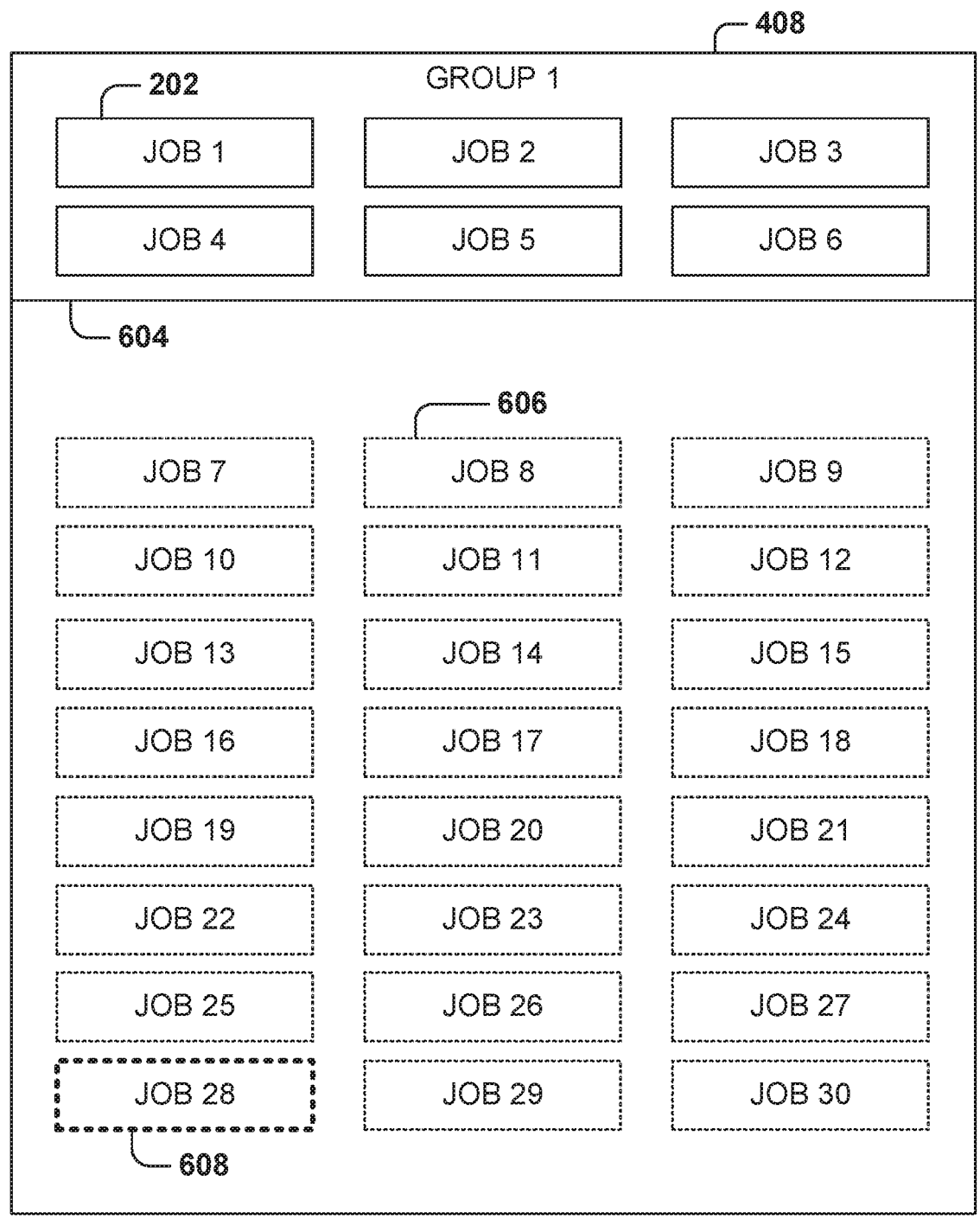
FIG. 6 illustrates a diagram of a group with a viewable portion including presented jobs and a non-viewable portion including hidden jobs.

FIG. 6 illustrates a diagram of a group area 408 with a viewable portion including presented jobs 202 and a non-viewable portion including hidden jobs. Within the group area 408, there are six "viewable" jobs 202 that are shown to the searching member through the user interface 402. In some embodiments, these job recommendations appear in the viewable area pursuant to one or more rankings, such as a ranking of the jobs based on one or more scores.

Below these six job recommendations is a visibility line 604 that signifies that the job opportunities presented below are not viewable. For example, job 8 606 and job 28 608 are not visible within the group area 408. In some embodiments, the system may determine the assignment of a job to a group based on whether the recommendation for the job 202 appears above or below the visibility line 604. For example, if the system determines that a first job to be presented in a first group and in a second group falls below the visibility line 604 based on a ranking in the first group but is above the visibility line 604 in the second group, then the system can designate the second group as the presenting group for the first job such that the job recommendation for that job is viewable to the searching member 160.

Figure 7A:
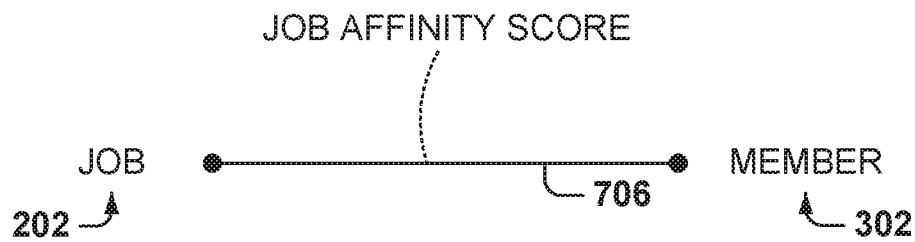
FIGS. 7A-7B illustrate the scoring of a job for a member, according to some example embodiments.
Figure 7B:
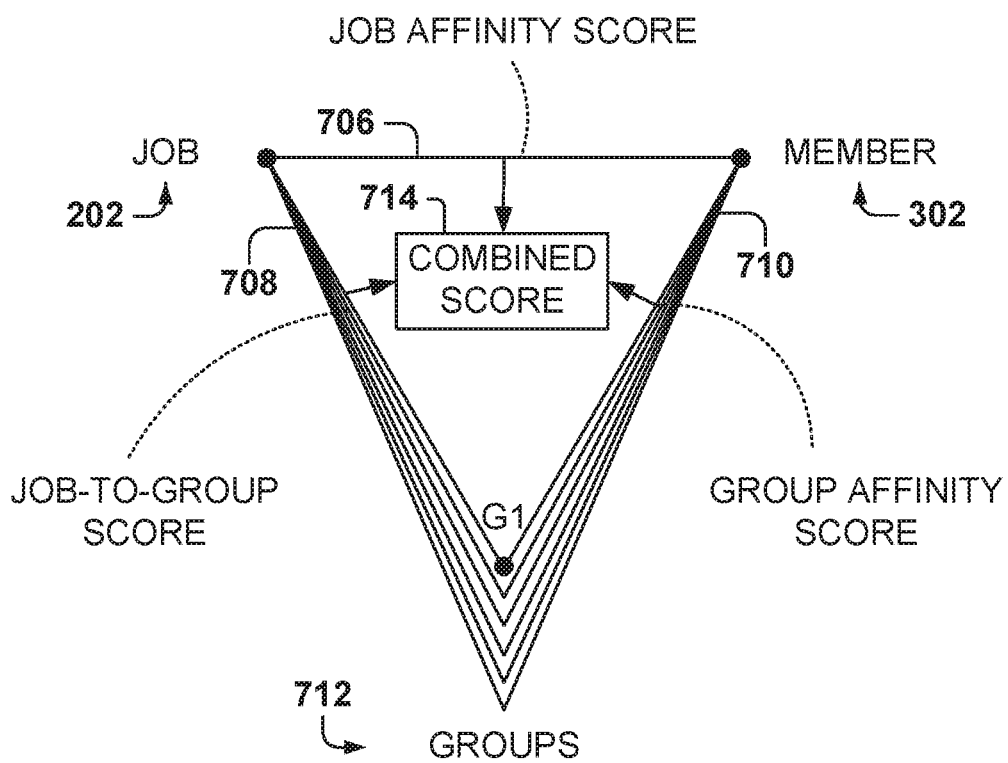

FIGS. 7A-7B illustrate the scoring of a job for a member, according to some example embodiments. FIG. 7A illustrates the scoring, also referred to herein as ranking, of a job 202 for a member associated with a member profile 302 based on a job affinity score 706.

The job affinity score 706, between a job 202 and a member, is a value that measures how well the job 202 matches the interest of the member in finding the job 202. A so-called "dream job" for a member would be the perfect job for the member and would have a high, or even maximum, value, while a job that the member is not interested in at all (e.g., in a different professional industry) would have a low job affinity score 706. In some example embodiments, the job affinity score 706 is a value between zero and one, or a value between zero and 100, although other ranges are possible.

In some example embodiments, a machine-learning program is used to calculate the job affinity scores 706 for the jobs 202 available to the member. The machine-learning program is trained with existing data in the social network, and the machine-learning program is then used to evaluate jobs 202 based on the features used by the machine-learning program. In some example embodiments, the features include any combination of job data (e.g., job title, job description, company, geographic location, etc.), member profile data, member search history, employment of social connections of the member, job popularity in the social network, number of days the job has been posted, company reputation, company size, company age, profit vs. nonprofit company, and pay scale. More details are provided below with reference to FIG. 8 regarding the training and use of the machine-learning program.

FIG. 7B illustrates the scoring of a job 202 for a member associated with the member profile 302, according to some example embodiments, based on three parameters: the job affinity score 706, a job-to-group score 708, and a group affinity score 710. Broadly speaking, the job affinity score 706 indicates how relevant the job 202 is to the member, the job-to-group score 708 indicates how relevant the job 202 is to a group 712, and the group affinity score 710 indicates how relevant the group 712 is to the member.

The group affinity score 710 indicates how relevant the group 712 is to the member, where a high affinity score indicates that the group 712 is very relevant to the member and should be presented in the user interface, while a low affinity score indicates that the group 712 is not relevant to the member and may be omitted from presentation in the user interface.

The group affinity score 710 is used, in some example embodiments, to determine which groups 712 are presented in the user interface, as discussed above, and the group affinity score 710 is also used to order the groups 712 when presenting them in the user interface, such that the groups 712 may be presented in the order of their respective group affinity scores 710. It is to be noted that if there is not enough "liquidity" of jobs for a group 712 (e.g., there are not enough jobs for presentation in the group 712), the group 712 may be omitted from the user interface or presented with lower priority, even if the group affinity score 710 is high.

In some example embodiments, a machine-learning program is utilized for calculating the group affinity score 710. The machine-learning program is trained with member data, including interactions of users with the different groups 712. The data for the particular member is then utilized by the machine-learning program to determine the group affinity score 710 for the member with respect to a particular group 712. The features utilized by the machine-learning program include the history of interaction of the member with jobs from the group 712, click data for the member (e.g., a click rate based on how many times the member has interacted with the group 712), member interactions with other members who have a relationship to the group 712, etc. For example, one feature may include an attribute that indicates whether the member is a student. If the member is a student, features such as social connections or education-related attributes will be important to determine which groups are of interest to the student. On the other hand, a member who has been out of school for 20 years or more may not be as interested in education-related features.

Another feature of interest to determine group participation is whether the member has worked in small companies or large companies throughout a long career. If the member exhibits a pattern of working for large companies, a group that provides jobs for large companies would likely be of more interest to the member than a group that provides jobs in small companies, unless there are other factors, such as recent interaction of the member with jobs from small companies.

The job-to-group score 708 between a job 202 and a group 712 indicates the job 202's strength within the context of the group 712, where a high job-to-group score 708 indicates that the job 202 is a good candidate for presentation within the group 712 and a low job-to-group score 708 indicates that the job 202 is not a good candidate for presentation within the group 712. In some example embodiments, a predetermined threshold is identified, wherein jobs 202 with a job-to-group score 708 equal to or above the predetermined threshold are included in the group 712, and jobs 202 with a job-to-group score 708 below the predetermined threshold are not included in the group 712.

For example, in a group 712 that presents jobs within the social network of the member, if there is a job 202 for a company within the network of the member, the job-to-group score 708 indicates how strong the member's network is for reaching the company of the job 202.

In some example embodiments, the job affinity score 706, the job-to-group score 708, and the group affinity score 710 are combined to obtain a combined affinity score 714 for the job 202. The scores may be combined utilizing addition, weighted averaging, or other mathematical operations.

FIG. 7B illustrates that, for a given job 202 and member profile 302, there may be a plurality of groups 712 G1, . . . , GN. Embodiments presented herein identify which jobs 202 fit better in which group 712, and which groups 712 have higher priority for presentation to the member.

In the education-company group, the job-to-group score 708 measures how many people who attended the educational institutions of the member associated with the member profile 302 made the transition from the educational institutions to the company associated with the job posting. The job-to-group score 708 provides an indication of whether the company is hiring relatively few or many people who attended the educational institution of the member. This is useful, because if the company hires relatively many graduates from the educational institution of the member, then the member has a better chance of landing the job with the company. Also, the member may benefit from working with colleagues from the same school, and the member may have connections that may help land the job.

Figure 8:
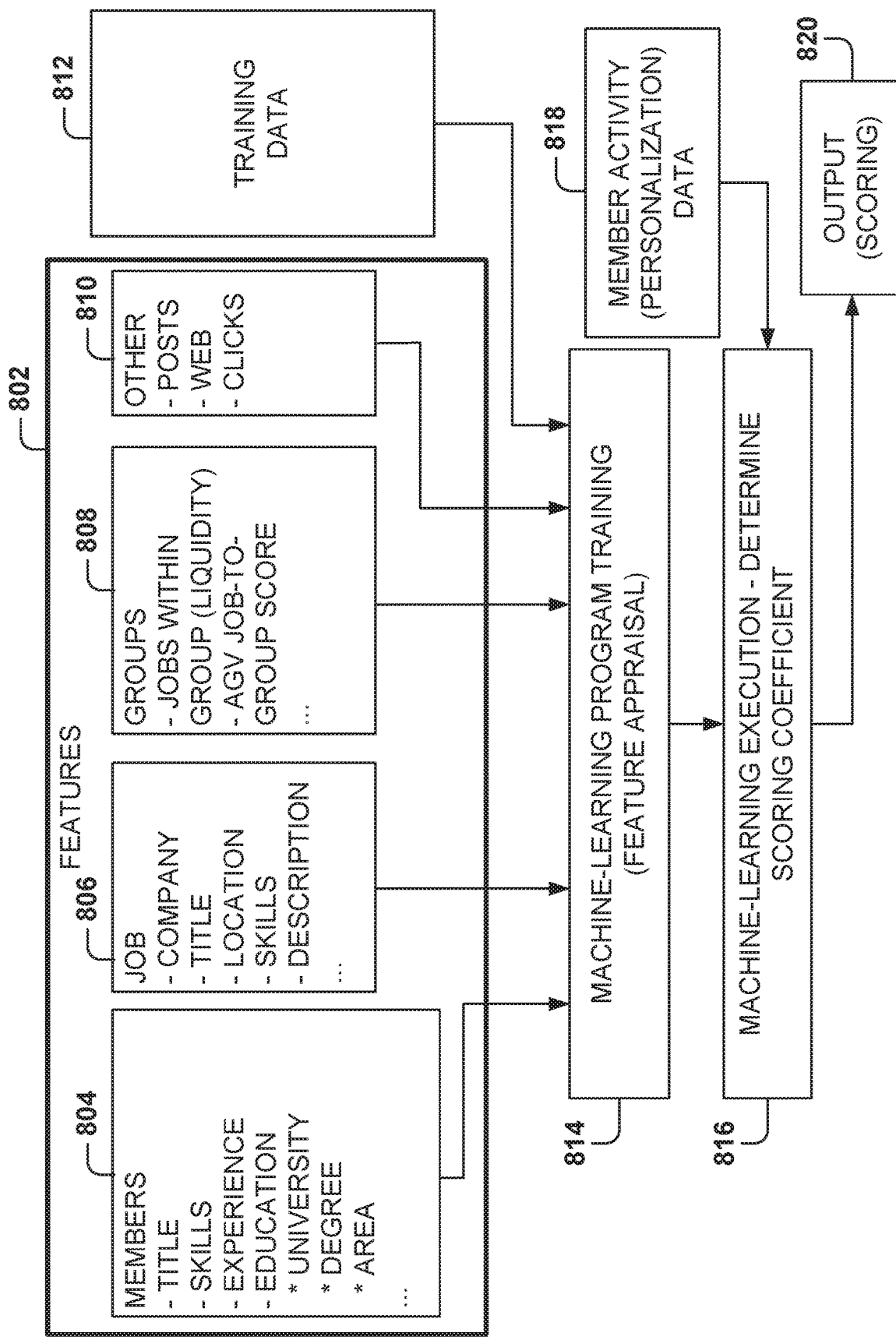
FIG. 8 illustrates the training and use of a machine-learning program, according to some example embodiments.

FIG. 8 illustrates the training and use of a machine-learning program 816 according to some example embodiments. In some example embodiments, machine-learning programs, also referred to as machine-learning algorithms or tools, are utilized to perform operations associated with job searches.

Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a model from example training data 812 in order to make data-driven predictions or decisions expressed as outputs or assessments (e.g., a score) 820. Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), matrix factorization, and Support Vector Machines (SVM) tools may be used for classifying or scoring job postings.

In general, there are two types of problems in machine learning: classification problems and regression problems. Classification problems aim at classifying items into one of several categories (for example, is this object an apple or an orange?). Regression algorithms aim at quantifying some items (for example, by providing a value that is a real number). In some embodiments, example machine-learning algorithms provide a job affinity score 706 (e.g., a number from 1 to 100) to qualify each job as a match for the user (e.g., calculating the job affinity score). In other example embodiments, machine learning is also utilized to calculate the group affinity score 710 and the job-to-group score 708. The machine-learning algorithms utilize the training data 812 to find correlations among identified features 802 that affect the outcome.

In one example embodiment, the features 802 may be of different types and may include one or more of member features 804, job features 806, group features 808, and other features 810. The member features 804 may include one or more of the data in the member profile 302, as described in FIG. 6, such as title, skills, experience, education, etc. The job features 806 may include any data related to the job 202, and the group features 808 may include any data related to the group. In some example embodiments, additional features in the other features 810 may be included, such as post data, message data, web data, click data, etc.

With the training data 812 and the identified features 802, the machine-learning tool is trained at operation 814. The machine-learning tool appraises the value of the features 802 as they correlate to the training data 812. The result of the training is the trained machine-learning program 816.

When the machine-learning program 816 is used to generate a score, new data, such as member activity 818, is provided as an input to the trained machine-learning program 816, and the machine-learning program 816 generates the score 820 as output. For example, when a member performs a job search, a machine-learning program, such as the machine-learning program 816, trained with social network data, uses the member data and job data from the jobs in the database to search for jobs that match the member's profile and activity.

Figure 9:
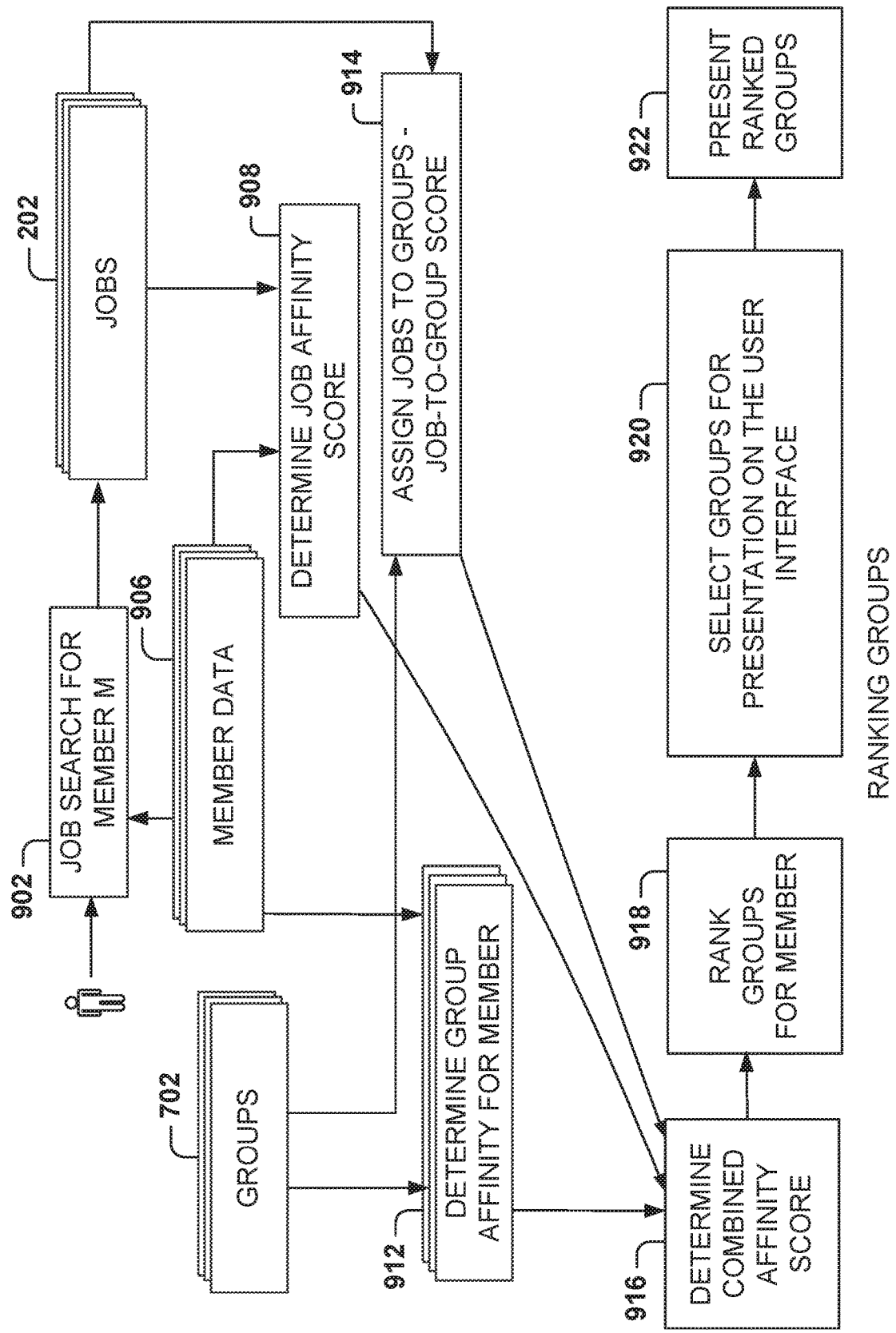
FIG. 9 illustrates a method for selecting groups to provide a personalized display of jobs, according to some example embodiments

FIG. 9 illustrates a method for selecting groups for presentation to a member in response to a search for a member in some example embodiments. A search for jobs is performed (at operation 902) for a member, such as the searching member 160. The search may be initiated by the member, such as by navigating to a "recommended jobs" page on a user interface, or may be initiated by the system to suggest jobs to the member. The system then accesses jobs 202, such as from the job database 128, groups 702, such as from the group database 130, and member data 906, such as from the member database 132.

The system further calculates a job affinity score between the member and each job based on the correlation between member data 906 and the job data, as described above pursuant to FIG. 7A. Similarly, the system compares each job 202 to each group 702 to determine a job-to-group score 708 calculated pursuant to FIG. 7B.

At operation 914, based on the calculated job-to-group score 708, the system assigns at least some jobs 202 to groups 702. The system further compares each group 702 to member data 906 to determine a group affinity score 710 for the member calculated pursuant to FIG. 7B. In some embodiments, the, a machine-learning program, such as the machine-learning program 816 from FIG. 8, is trained with member, job, group, and company data, as described above with reference to FIG. 8, to determine the correlation of features for calculating the job affinity score, the job-to-group score 708, and the group affinity score 710.

In an example embodiment, once the machine-learning program 816 is trained, it calculates the job affinity score, the job-to-group score 708, and the group affinity score 710 based on the member, job, group data, and other data.

For example, group features 808 associated with a company-culture group are retrieved. These group features in this example include culture features that are designated as being relevant to determining the culture of the company and located in the group database 130. An example of the company-culture group feature is an indicator that more than 60% of the company employees remain at the company for more than five years. The system further retrieves member features 804 (e.g., experience, job title, education) included in the member profile 302 of the searching member 160, and other features 810 (e.g., click data, use of site features) associated with actions of the searching member 160 for use by a machine-learning program, such as the machine-learning program 816 from FIG. 8. An example of a member feature 804 may include an indicator that the member has worked an average of at least 8 years in previous companies (e.g., four years with a first company and twelve years with a second company).

The system uses machine learning in this example to correlate the member features 804, group features 808, and other features 810, and based on this analysis, determines a group affinity score 710 between the company-culture group and the searching member 160. Using similar techniques, the system can further determine a job-to-group score 708 between a first job 202 and a group 712 (such as the company culture group) using job features 806, member features 804, and other features 810 as described above in FIGS. 7A-7B.

After the job-to-group scores 708 between jobs 202 within a group and the group 712 are calculated, at operation 916, a combined affinity score CAS 714 is calculated based on the job affinity scores (between the jobs and the member), the job-to-group scores 708 (of the jobs within a group), and the group affinity score (between the member and the respective group).

In some example embodiments, the CAS is calculated according to the following equation:

$$CAS = \alpha(S_{Group}, S_{Job}, S_{Job-Group}, S_{Global})$$

Where $S_{Group}$ is the group affinity score, $S_{Job}$ is the job affinity score, $S_{Job-Group}$ is the job-to-group score, $S_{Global}$ is the global affinity score, and a is a function that combines these variables. The parameters may be combined in different ways, such as by addition, by a weighted average, by multiplication, by calculating the median, etc.

In some example embodiments, the CAS is calculated as:

$$CAS = a \cdot S_{Group} + b \cdot S_{Job} + c \cdot S_{Job-Group} + d \cdot S_{Global}$$

Where a, b, c, and d are respective coefficients for weighing the respective parameters. In another example embodiment, the CAS may be calculated as:

$$CAS = S_{Group}^a \cdot S_{Job}^b \cdot S_{Job-Group}^c \cdot S_{Global}^d$$

In yet other embodiments, the parameters may be combined by utilizing addition and multiplication of the parameters. In some example embodiments, the coefficients a, b, c, and d are predetermined. Further, the coefficients a, b, c, and d may be fine tuned by the system based on goals and performance tests. For example, if users are selecting to view jobs presented in a few groups, the system may increase the coefficient of the group affinity score $S_{Group}$.

In some embodiments one or more of the coefficients may be equal to zero. For example, the d coefficient may be set to zero if the $S_{Global}$ parameters is omitted from the CAS calculation.

For example, the system may determine that the group affinity score for the group "company culture" is 58. The job posting titled "technical correspondent" is included within the group profile "company culture," and the system has determined a job affinity score of 29 for the "technical correspondent" job as related to the member profile 302. The system has further determined that the job-to-group score for the "technical correspondent" job and the "company culture" group is 38. The system then determines the average job affinity score for jobs within "company culture" is 38 and the average job-to-group score for jobs within "company culture" is 52. Based on this job affinity score and the group affinity score, the system determines that the combined affinity score for the group is 44.25 if the formula in the first embodiment is used and the coefficients for each score (a, b, c, and d) are each 0.25.

In other examples, the combined affinity score 714 may be determined based on different metrics, such as an average of the group affinity score and the average job affinity score, and the system may assign a higher score to the "company culture" group profile if the system determines the job affinity score transgresses a job relevance threshold.

In some example embodiments, the machine-learning system described in FIG. 8 is further used to generate one or more of the scoring coefficients. In one embodiment, the machine-learning tool is trained with click data (e.g., clicks on jobs posted in groups) to calculate the coefficients a, b, c, and d.

In some embodiments, a stronger shared characteristic (i.e. greater similarity of features) between the group and the member profile may yield a higher scoring coefficient. In addition, the liquidity of a group (i.e., how many jobs are available for presentation in the group) may be used by the system to determine the scoring coefficient.

The global affinity score $S_{Global}$ is indicative of overall member activity for all members using the social networking server 120. For example, click data from multiple members using the social networking server 120 is assessed by the system to determine the global affinity score.

In an example, the system calculates the average job affinity score within a group by adding the job affinity scores 706 of all jobs 202 within the group 712 and dividing the sum by the number of jobs 202 in the group. The system further determines an average job-to-group score for jobs within the group. At operation 918, the groups are ranked for presentation to the searching member 160 based one or more of the scores. For example, the system compares and orders the groups strictly based on the group affinity score 710 where the highest scoring group is ranked first. Alternatively, the ranking could be based on the CAS 714.

In some example embodiments, the ranking the groups is based on the strength of the job affinity scores of jobs within the group. For example, a first group having an average job affinity score of 52 will be ranked higher than a second group having an average job affinity score of 35.

In some example embodiments, the ranking of the groups is based on interactions (e.g., click data) by the member with the groups. For example, a group that the member has previously had an interaction with will be ranked higher since in follows that the user has expressed interest in the job. The member interaction can be tracked and analyzed using machine-learning programs 816. In some embodiments, interactions are used by the machine-learning programs to determine scores such as the group affinity scores as shown in FIG. 8.

In some example embodiments, the ranking of the groups is further based on the liquidity of jobs (e.g., quantity of jobs available for presentation) within each group. For example, if a first group includes 260 jobs, it may be ranked higher than a second group that only includes 40 jobs. In further example embodiments, a group may be ranked higher based on surpassing a liquidity threshold. For example, the ranking for a first group may be raised significantly based on the liquidity of the group transgressing a threshold of 150 jobs.

At operation 920, the system selects a quantity of groups to display to the searching member 160. In some embodiments, an algorithm is included that determines groups 712 to include based on a maximum number of groups 712 to present to a user. For example, the algorithm may determine that 10 groups 712 are included, and thus the top ten groups are presented according to their ranking.

At operation 922, the system displays the selected quantity of groups 712 within the group area 408. Thus, in response to the original search for jobs 902, the social networking server 120 returns a personalized list of groups 712 that are determined to be relevant to the searching member 160.

In some embodiments, the system additionally displays a select-favorite option next to each group 712 displayed that is selectable by the searching member 160 to designate a group 712 as a favorite group. In some example embodiments, the favorite status of the groups is used for ranking the groups for presentation. In one example embodiment, the groups with the favorite status are presented ahead of groups without the favorite status, as long as there is at least one job to be presented within one of the favorite groups.

Figure 10:
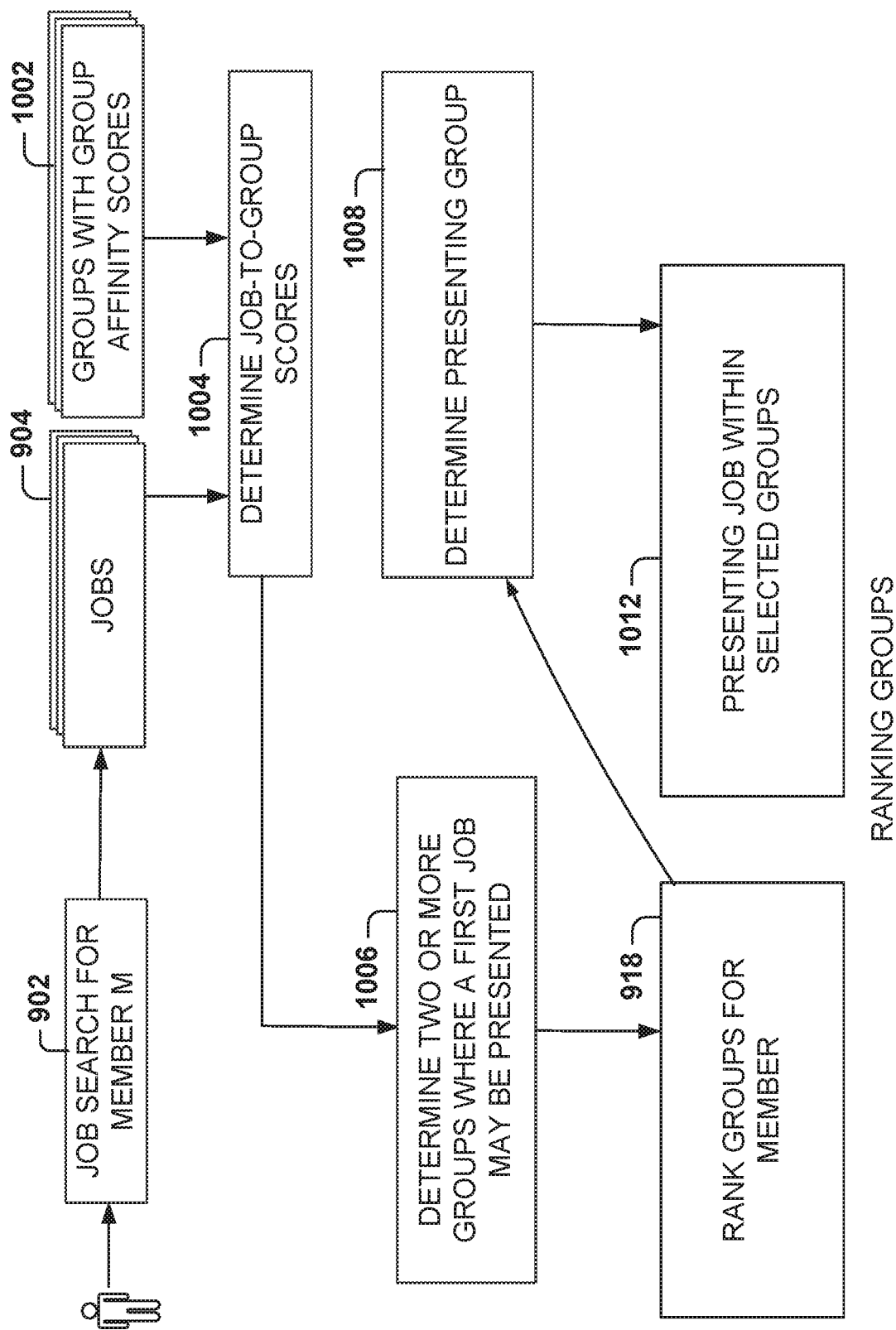
FIG. 10 illustrates a method for selecting jobs for presentation within a group, according to some example embodiments.

FIG. 10 illustrates a method for selecting jobs for presentation within a group, according to some example embodiments. Similar to FIG. 9, the member initiates a search for relevant jobs (operation 902), such as by navigating to a "recommended jobs" page on a user interface. The system then accesses jobs 904, such as from the job database 128 of FIG. 1 and groups with respective group affinity scores 1002, such as the group affinity scores determined by the system pursuant to FIG. 9. Also similar to FIG. 9, the system compares each job 202 to each group 1002 to determine a job-to-group score calculated pursuant to FIG. 7B.

At operation 1006, the system determines that a first job is to be included for presentation in two or more groups based on the job-to-group score for the job in each group. In some example embodiments, the determination of inclusion within the two or more groups is made by the system ranking each job within each group based on the job-to-group score, with jobs with higher job-to-group scores ranked higher than jobs with lower job-to-group scores.

In an example embodiment, jobs are included in a group based on a maximum number of jobs available for presentation within the group, with the highest-ranked jobs included until the maximum number is met. Thus, if only the maximum number of jobs available for presentation within a group is 50, the top 50 jobs having the highest job-to-group score will be selected for presentation.

In another example embodiment, jobs are included in a group for presentation based on the jobs transgressing a ranking threshold. The ranking threshold may be located on one of the databases 128 and may be tunable by the system. In an example, the system determines that the ranking threshold for a first group is 65.28. In this example, any job with a job-to-group score of 65.28 or greater would be selected for presentation.

At operation 918, the groups designated for presentation are ranked based on the group affinity score between each group and the searching member. This includes ranking of the groups for presentation, where, as discussed above, the ranking may be based on the CAS, or the job-to-group scores in the groups, etc.

At operation 1008, the system determines a presenting group from the two or more groups determined at operation 1006. Various techniques and algorithms may be used to determine a presenting group from the groups where the job could be presented. In an example embodiment, the ranking from 918 is used to determine the presenting group, where the highest ranked group is selected as the job-presenting group.

In an example embodiment, a presenting group is determined based on the ranking of the groups for the member selected on the basis of the ranking of groups for the member. In an example, the top-ranked group after the In another example embodiment, a presenting group is selected on the basis of the ranking of the group based on the global affinity score of the group as discussed above, where the overall activity of all members with a group is considered. Other embodiments may include any combination of the job-to-group score, the group affinity score, and the global affinity score when determining the presenting group.

In an example embodiment of determining the presenting group, the system executes a deduping algorithm to select a single group for presentation where two or more groups could be used for presenting the job. In other example embodiments, the job may be presented in more than one group, and the system selects in which groups to show the job. For example, if a job may be presented in three different groups, the deduping algorithm may select to present the job in one of the three groups or in two of the three groups.

In some example embodiments, the system designates a predetermined number of presentable spots for jobs within each group. Therefore, some jobs may not be displayed within the group even if they are designated for presentation within the group. For example, the optimization algorithm may detect that the top-ranked group based on the job-to-group score will not result in a first job being displayed, because the job is ranked outside the top 20 jobs within the group and the group presents the top 20 jobs within the group to the user. Responsive to this determination, the second-ranked group is designated as the presenting group for the job.

In additional example embodiments, the deduping algorithm allows for a greater number of presenting groups. In an example, the deduping algorithm is programmed (e.g., using rules located on a database 128) to allow for the presentation of a job within up to three groups. In this example, after running the optimization algorithm to determine a first presenting group, the system would further run the optimization algorithm to determine a second presenting group followed by a third presenting group. Thus, after running the optimization algorithm, three groups out of the groups designated for presentation would actually present the job.

At operation 1010, the system ranks the groups for presentation to the searching member 160. This ranking is conducted pursuant to operation 918 discussed in FIG. 9. At operation 1012, the jobs are presented within the presenting group, such as on a user interface 402 of the searching member 160 as shown in FIG. 4.

Figure 11:
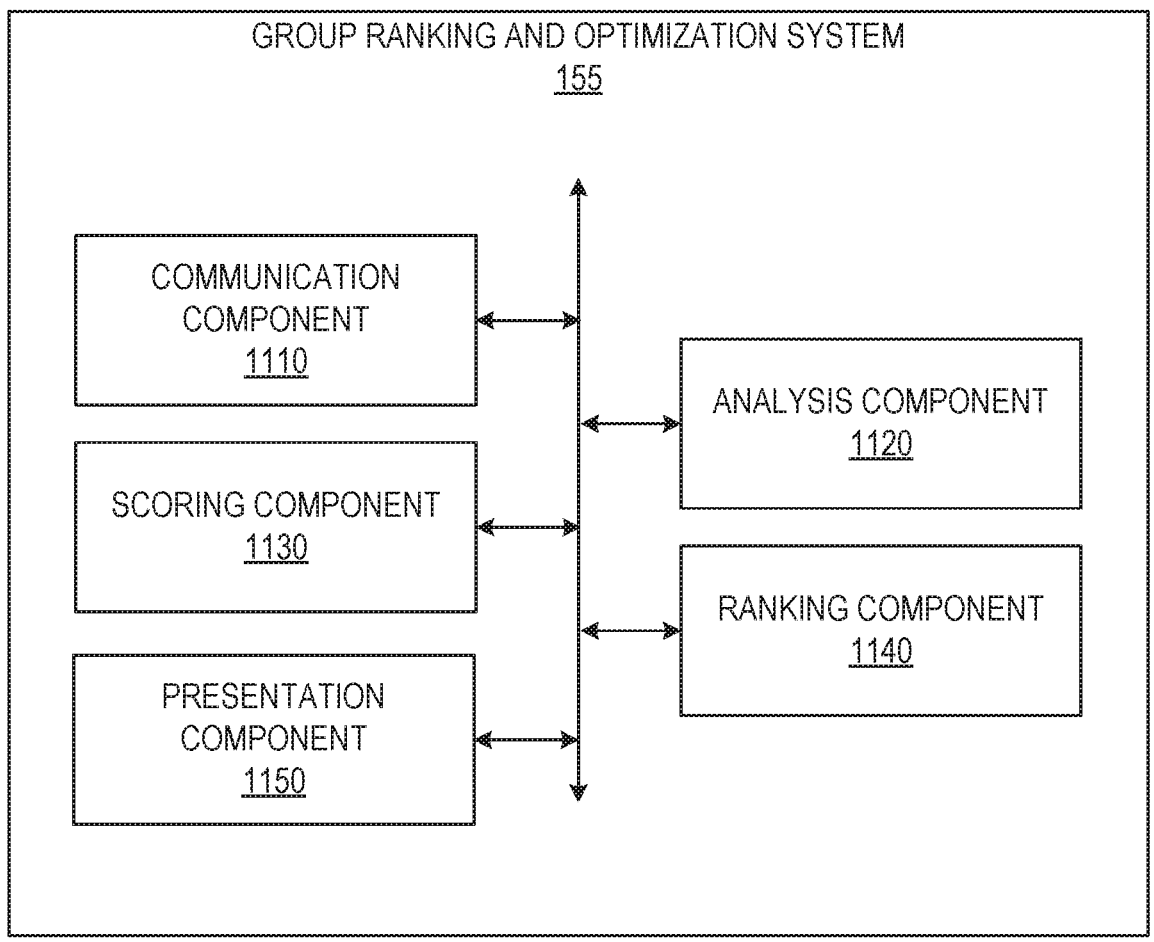
FIG. 11 illustrates a group ranking and optimization system within a network architecture for implementing example embodiments.

FIG. 11 illustrates the group ranking and optimization system 155 for implementing example embodiments. In one example embodiment, group ranking and optimization system 155 includes a communication component 1110, an analysis component 1120, a scoring component 1130, a ranking component 1140, and a presentation component 1150.

The communication component 1110 provides various data retrieval and communications functionality. In example embodiments, the communication component 1110 retrieves data from the databases 132, 128, 130, and 134 including member data, jobs, group data, group features 808, job features 806, and member features 804. The communication component 1110 can further retrieve data from the databases 132, 128, 130, and 134 related to rules such as threshold data and data related to the maximum quantity of jobs displayable within a group.

The analysis component 1120 performs operations such as comparing various features included in groups 712, jobs 202, and the member profile 302. Additionally, the analysis component 1120 performs machine-learning programs 816 described in FIG. 8. In some embodiments, the analysis component 1120 further compares groups to determine one or more groups for presentation of a job and also a presenting group for the job.

The scoring component 1130 calculates the job affinity scores 706, as illustrated above with reference to FIGS. 7A-7B and 8-10. The scoring component 1130 calculates the job-to-group scores 708, as illustrated above with reference to FIGS. 7B and 8-10. The scoring component 1130 further calculates the group affinity scores 710, as illustrated above with reference to FIGS. 7B and 8-10.

The ranking component 1140 provides functionality to rank groups and jobs based on the scores as shown in the above embodiments and examples. In an example, the ranking component 1140 generates a ranked list of groups based on the group affinity score 710 determined by the scoring component 1130.

The presentation component 1150 provides functionality to present a display of the groups including jobs to the searching member 160, such as on the user interface 402. The presentation component 1150 may further present selectable options to the user, such as a favorite option.

It is to be noted that the embodiments illustrated in FIG. 11 are examples and do not describe every possible embodiment. Other embodiments may utilize different servers or additional servers, combine the functionality of two or more servers into a single server, utilize a distributed server pool, and so forth. The embodiments illustrated in FIG. 11 should therefore not be interpreted to be exclusive or limiting, but rather illustrative.

Figure 12:
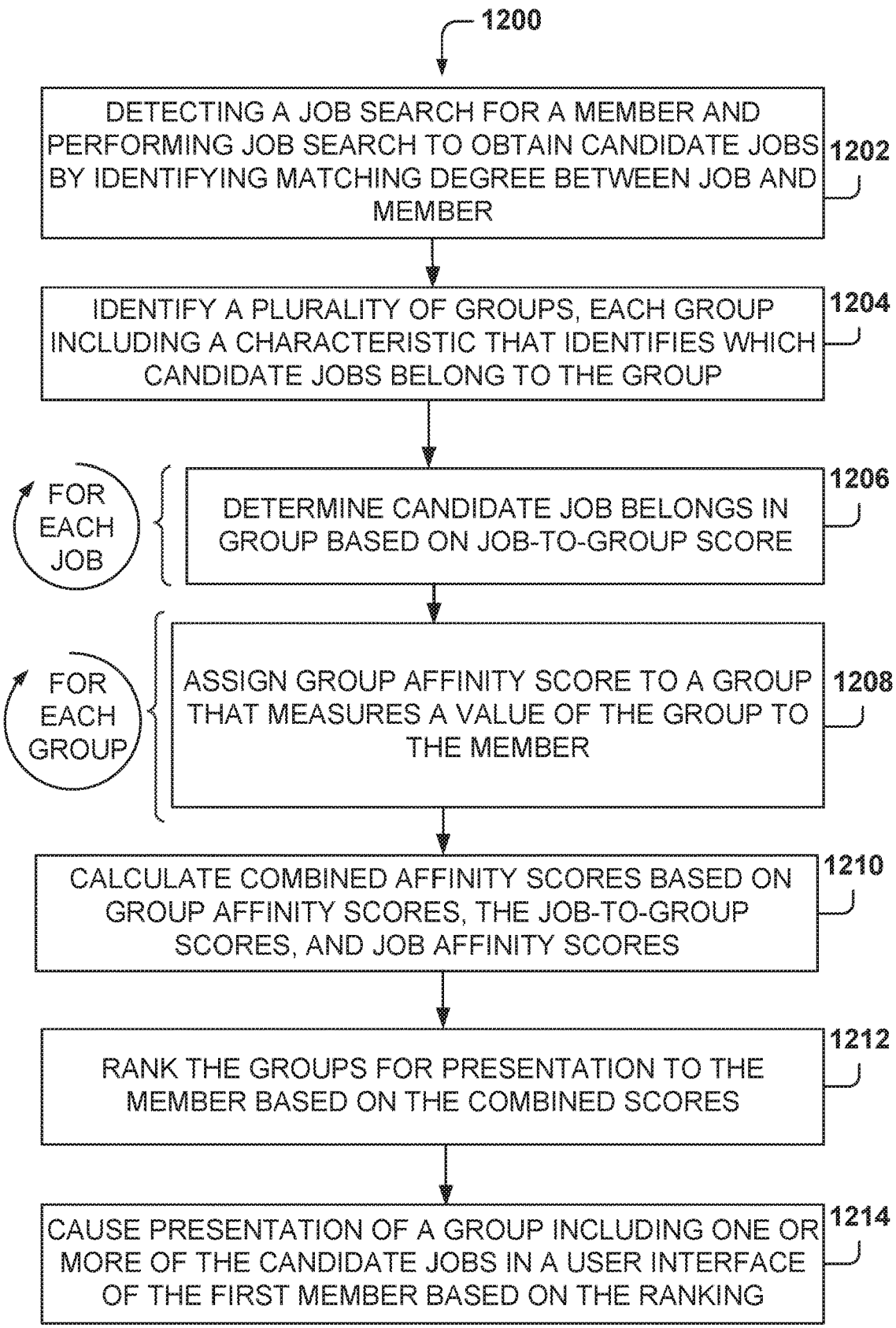
FIG. 12 is a flowchart of a method, according to some example embodiments, for generating a personalized display of groups that include job postings.

FIG. 12 is a flowchart of a method 1200, according to some example embodiments, for generating personalized rankings for the searching member 160. While the various operations in this flowchart are presented and described sequentially, one of ordinary skill will appreciate that some or all of the operations may be executed in a different order, be combined or omitted, or be executed in parallel. Operation 1202 is for detecting, by a server having one or more processors, a job search requested by a searching member 160 and performing a search of jobs within the job database 128 to obtain candidate jobs.

From operation 1202, the method 1200 flows to operation 1204, where the server identifies a plurality of groups with each group having a characteristic comprised of features that identifies which candidate jobs should be included in the group. From operation 1204, the method 1200 flows to operation 1206, where the server determines which group each candidate job belongs to based on the job-to-group score of the candidate job. From operation 1206, the method 1200 flows to operation 1208 where the server assigns a group affinity score to each group that measures a value of the group to the searching member 160.

At operation 1210, the server calculates a combined affinity score for each group based on the job affinity scores, job-to-group score, and group affinity score for each group. At operation 1212, the server ranks the groups for presentation to the searching member 160 based on the combined affinity score. Finally, at operation 1214, the server causes presentation of a group including one or more of the candidate jobs within a user interface, the position of the presentation based on the ranking of the group.

Figure 13:
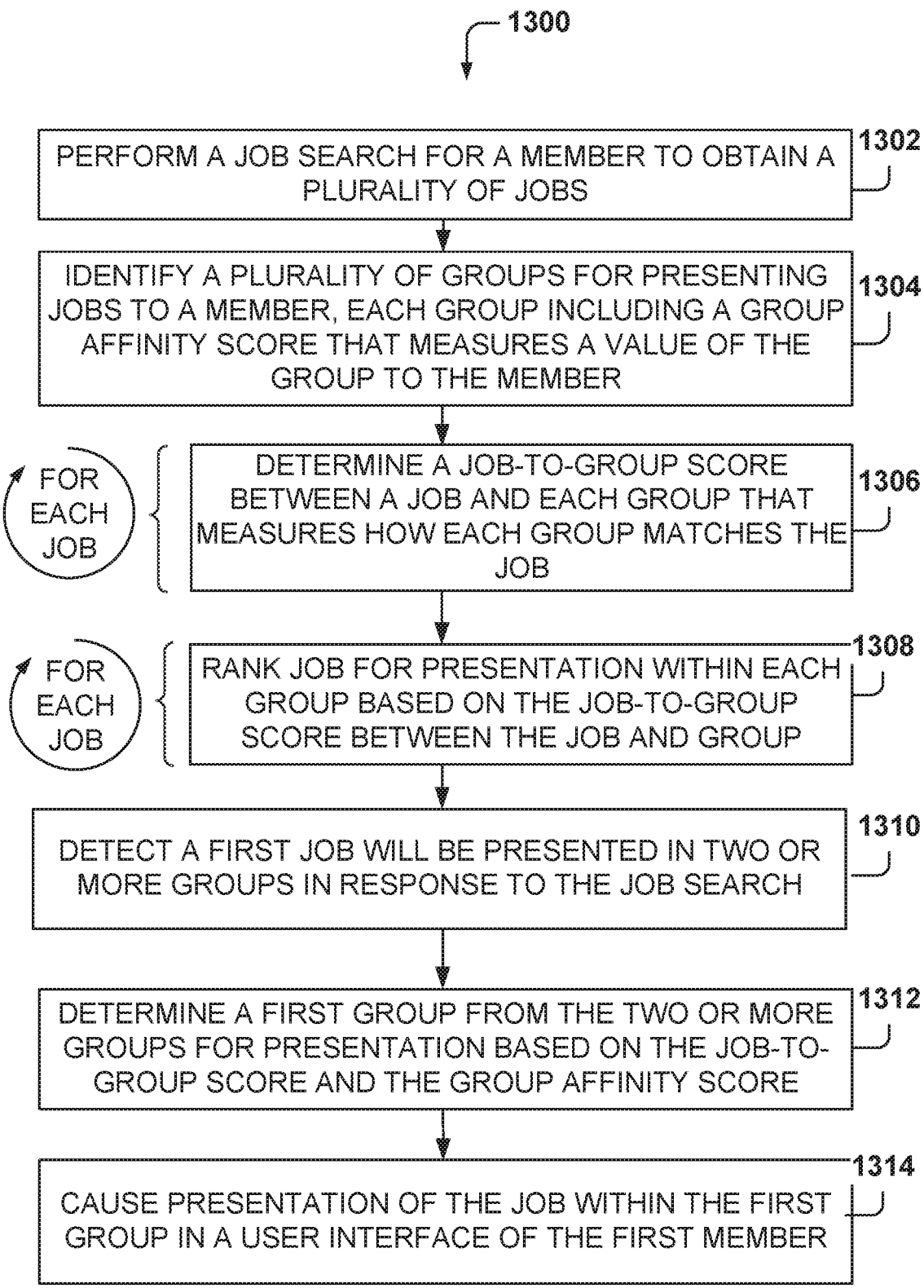
FIG. 13 is a flowchart of a method, according to some example embodiments, for classifying jobs for optimal presentation within groups.

FIG. 13 is a flowchart of a method 1300, according to some example embodiments, for classifying jobs being presented within groups. While the various operations in this flowchart are presented and described sequentially, one of ordinary skill will appreciate that some or all of the operations may be executed in a different order, be combined or omitted, or be executed in parallel. Operation 1302 is for performing, by a server having one or more processors, a job search requested by a searching member 160 and performing a search of jobs within the job database 128 to obtain candidate jobs.

From operation 1302, the method 1300 flows to operation 1304, where the server identifies a plurality of groups for presenting jobs to a member. Each group within the plurality further includes a group affinity score that measures a value of the group to the searching member 160. From operation 1304, the method 1300 flows to operation 1306, where the server determines a job-to-group score for each group that measures the degree to which each job matches the group. From operation 1306, the method 1300 flows to operation 1308, where the server ranks each job for presentation within each group based on the job-to-group score between the job and the group. The method 1300 then flows to operation 1310 where, based on the ranking determined in operation 1308 and the job-to-group score determined in operation 1306, the system determines that two or more group are designated for presentation of the job. The method 1300 then flows to operation 1312, where a first group from the two or more groups is determined as a presenting group based on the ranking determined in operation 1308, the job-to-group score determined in operation 1306, and the group affinity score. Finally, the method 1300 flows to operation 1314, where the system causes presentation of the job within the presenting group in a user interface that is viewable by the searching member 160.

Figure 14:
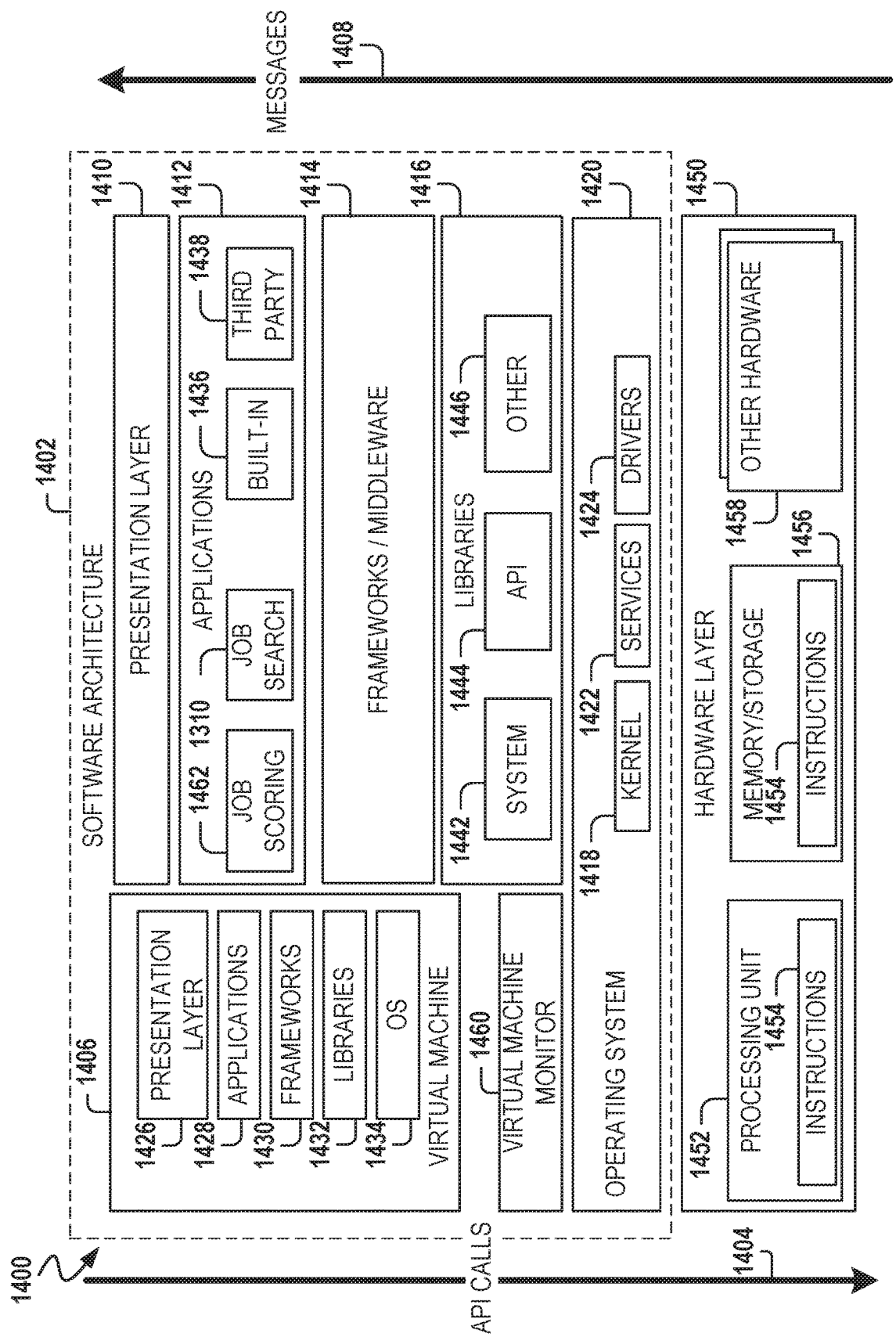
FIG. 14 is a block diagram illustrating an example of a software architecture that may be installed on a machine, according to some example embodiments.

FIG. 14 is a block diagram 1400 illustrating a representative software architecture 1402, which may be used in conjunction with various hardware architectures herein described. FIG. 14 is merely a non-limiting example of a software architecture 1402, and it will be appreciated that many other architectures may be implemented to facilitate the functionality described herein. The software architecture 1402 may be executing on hardware such as a machine 1500 of FIG. 15 that includes, among other things, processors 1504, memory/storage 1506, and input/output (I/O) components 1518. A representative hardware layer 1450 is illustrated and can represent, for example, the machine 1500 of FIG. 15. The representative hardware layer 1450 comprises one or more processing units 1452 having associated executable instructions 1454. The executable instructions 1454 represent the executable instructions of the software architecture 1402, including implementation of the methods, modules, and so forth of FIGS. 1-6, 8, and 10-12. The hardware layer 1450 also includes memory and/or storage modules 1456, which also have the executable instructions 1454. The hardware layer 1450 may also comprise other hardware 1458, which represents any other hardware of the hardware layer 1450, such as the other hardware illustrated as part of the machine 1500.

In the example architecture of FIG. 14, the software architecture 1402 may be conceptualized as a stack of layers where each layer provides particular functionality. For example, the software architecture 1402 may include layers such as an operating system 1420, libraries 1416, frameworks/middleware 1414, applications 1412, and a presentation layer 1410. Operationally, the applications 1412 and/or other components within the layers may invoke application programming interface (API) calls 1404 through the software stack and receive a response, returned values, and so forth illustrated as messages 1408 in response to the API calls 1404. The layers illustrated are representative in nature, and not all software architectures have all layers. For example, some mobile or special-purpose operating systems may not provide a frameworks/middleware layer 1414, while others may provide such a layer. Other software architectures may include additional or different layers.

The operating system 1420 may manage hardware resources and provide common services. The operating system 1420 may include, for example, a kernel 1418, services 1422, and drivers 1424. The kernel 1418 may act as an abstraction layer between the hardware and the other software layers. For example, the kernel 1418 may be responsible for memory management, processor management (e.g., scheduling), component management, networking, security settings, and so on. The services 1422 may provide other common services for the other software layers. The drivers 1424 may be responsible for controlling or interfacing with the underlying hardware. For instance, the drivers 1424 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1416 may provide a common infrastructure that may be utilized by the applications 1412 and/or other components and/or layers. The libraries 1416 typically provide functionality that allows other software modules to perform tasks in an easier fashion than by interfacing directly with the underlying operating system 1420 functionality (e.g., kernel 1418, services 1422, and/or drivers 1424). The libraries 1416 may include system libraries 1442 (e.g., C standard library) that may provide functions such as memory allocation functions, string manipulation functions, mathematic functions, and the like. In addition, the libraries 1416 may include API libraries 1444 such as media libraries (e.g., libraries to support presentation and manipulation of various media formats such as MPEG4, H.264, MP3, AAC, AMR, JPG, PNG), graphics libraries (e.g., an OpenGL framework that may be used to render two-dimensional and three-dimensional graphic content on a display), database libraries (e.g., SQLite that may provide various relational database functions), web libraries (e.g., WebKit that may provide web browsing functionality), and the like. The libraries 1416 may also include a wide variety of other libraries 1446 to provide many other APIs to the applications 1412 and other software components/modules.

The frameworks 1414 (also sometimes referred to as middleware) may provide a higher-level common infrastructure that may be utilized by the applications 1412 and/or other software components/modules. For example, the frameworks 1414 may provide various graphic user interface (GUI) functions, high-level resource management, high-level location services, and so forth. The frameworks 1414 may provide a broad spectrum of other APIs that may be utilized by the applications 1412 and/or other software components/modules, some of which may be specific to a particular operating system or platform.

The applications 1412 include job-scoring applications 1462, job search/suggestions 1464, built-in applications 1436, and third-party applications 1438. The job-scoring applications 1462 comprise the job-scoring applications, as discussed above with reference to FIG. 11. Examples of representative built-in applications 1436 may include, but are not limited to, a contacts application, a browser application, a book reader application, a location application, a media application, a messaging application, and/or a game application. The third-party applications 1438 may include any of the built-in applications 1436 as well as a broad assortment of other applications. In a specific example, the third-party application 1438 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 1438 may invoke the API calls 1404 provided by the mobile operating system such as the operating system 1420 to facilitate functionality described herein.

The applications 1412 may utilize built-in operating system functions (e.g., kernel 1418, services 1422, and/or drivers 1424), libraries (e.g., system libraries 1442, API libraries 1444, and other libraries 1446), or frameworks/middleware 1414 to create user interfaces to interact with users of the system. Alternatively, or additionally, in some systems, interactions with a user may occur through a presentation layer, such as the presentation layer 1410. In these systems, the application/module "logic" can be separated from the aspects of the application/module that interact with a user.

Some software architectures utilize virtual machines. In the example of FIG. 14, this is illustrated by a virtual machine 1406. A virtual machine creates a software environment where applications/modules can execute as if they were executing on a hardware machine (such as the machine 1500 of FIG. 15, for example). The virtual machine 1406 is hosted by a host operating system (e.g., operating system 1420 in FIG. 14) and typically, although not always, has a virtual machine monitor 1460, which manages the operation of the virtual machine 1406 as well as the interface with the host operating system (e.g., operating system 1420). A software architecture executes within the virtual machine 1406, such as an operating system 1434, libraries 1432, frameworks/middleware 1430, applications 1428, and/or a presentation layer 1426. These layers of software architecture executing within the virtual machine 1406 can be the same as corresponding layers previously described or may be different.

Figure 15:
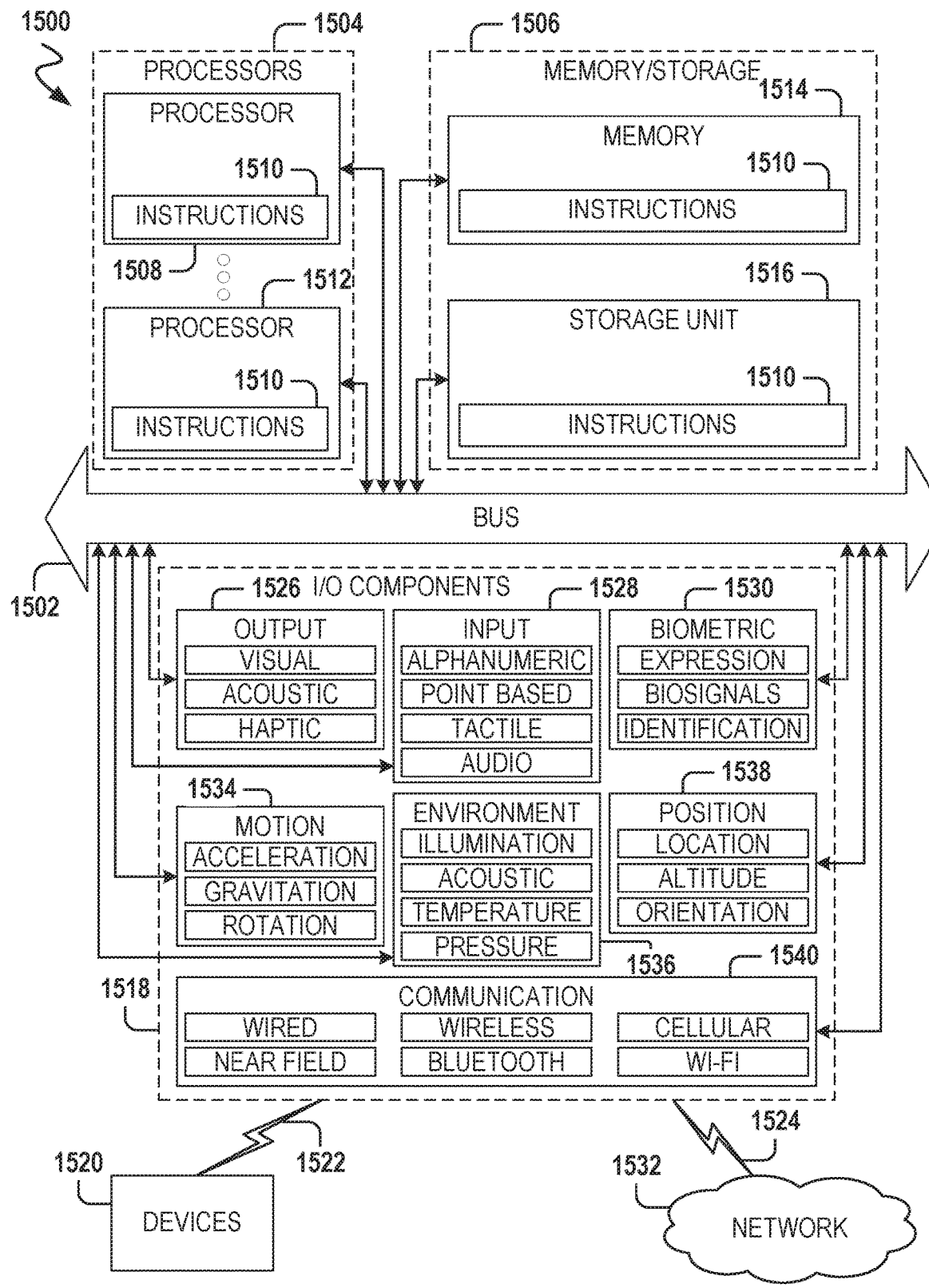
FIG. 15 is a diagrammatic representation of a machine in the form of a computer system within which a set of instructions may be executed for causing the machine to perform any one or more of the methodologies discussed herein, according to an example embodiment.

FIG. 15 is a block diagram illustrating components of a machine 1500, according to some example embodiments, able to read instructions from a machine-readable medium (e.g., a machine-readable storage medium) and perform any one or more of the methodologies discussed herein. Specifically, FIG. 15 shows a diagrammatic representation of the machine 1500 in the example form of a computer system, within which instructions 1510 (e.g., software, a program, an application, an applet, an app, or other executable code) for causing the machine 1500 to perform any one or more of the methodologies discussed herein may be executed. For example, the instructions 1510 may cause the machine 1500 to execute the flow diagrams of FIGS. 10 and 12. Additionally, or alternatively, the instructions 1510 may implement the job-scoring programs and the machine-learning programs associated with them. The instructions 1510 transform the general, non-programmed machine 1500 into a particular machine 1500 programmed to carry out the described and illustrated functions in the manner described.

In alternative embodiments, the machine 1500 operates as a standalone device or may be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 may comprise, but not be limited to, a switch, a controller, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1510, sequentially or otherwise, that specify actions to be taken by the machine 1500. Further, while only a single machine 1500 is illustrated, the term "machine" shall also be taken to include a collection of machines 1500 that individually or jointly execute the instructions 1510 to perform any one or more of the methodologies discussed herein.

The machine 1500 may include processors 1504, memory/storage 1506, and I/O components 1518, which may be configured to communicate with each other such as via a bus 1502. In an example embodiment, the processors 1504 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1508 and a processor 1512 that may execute the instructions 1510. The term "processor" is intended to include multi-core processors that may comprise two or more independent processors (sometimes referred to as "cores") that may execute instructions contemporaneously. Although FIG. 15 shows multiple processors 1504, the machine 1500 may include a single processor with a single core, a single processor with multiple cores (e.g., a multi-core processor), multiple processors with a single core, multiple processors with multiples cores, or any combination thereof.

The memory/storage 1506 may include a memory 1514, such as a main memory, or other memory storage, and a storage unit 1516, both accessible to the processors 1504 such as via the bus 1502. The storage unit 1516 and memory 1514 store the instructions 1510 embodying any one or more of the methodologies or functions described herein. The instructions 1510 may also reside, completely or partially, within the memory 1514, within the storage unit 1516, within at least one of the processors 1504 (e.g., within the processor's cache memory), or any suitable combination thereof, during execution thereof by the machine 1500. Accordingly, the memory 1514, the storage unit 1516, and the memory of the processors 1504 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 1510. The term "machine-readable medium" shall also be taken to include any medium, or combination of multiple media, that is capable of storing instructions (e.g., instructions 1510) for execution by a machine (e.g., machine 1500), such that the instructions, when executed by one or more processors of the machine (e.g., processors 1504), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1518 may include a wide variety of components to receive input, provide output, produce output, transmit information, exchange information, capture measurements, and so on. The specific I/O components 1518 that are included in a particular machine will depend on the type of machine. For example, portable machines such as mobile phones will likely include a touch input device or other such input mechanisms, while a headless server machine will likely not include such a touch input device. It will be appreciated that the I/O components 1518 may include many other components that are not shown in FIG. 15. The/O components 1518 are grouped according to functionality merely for simplifying the following discussion, and the grouping is in no way limiting. In various example embodiments, the I/O components 1518 may include output components 1526 and input components 1528. The output components 1526 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1528 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1518 may include biometric components 1530, motion components 1534, environmental components 1536, or position components 1538 among a wide array of other components. For example, the biometric components 1530 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1534 may include acceleration sensor components (e.g., accelerometer), gravitation sensor components, rotation sensor components (e.g., gyroscope), and so forth. The environmental components 1536 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1538 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1518 may include communication components 1540 operable to couple the machine 1500 to a network 1532 or devices 1520 via a coupling 1524 and a coupling 1522, respectively. For example, the communication components 1540 may include a network interface component or other suitable device to interface with the network 1532. In further examples, the communication components 1540 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1520 may be another machine or any of a wide variety of peripheral devices (e.g., a peripheral device coupled via a USB).

Moreover, the communication components 1540 may detect identifiers or include components operable to detect identifiers. For example, the communication components 1540 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1540, such as location via Internet Protocol (IP) geo-location, location via Wi-Fi® signal triangulation, location via detecting an NFC beacon signal that may indicate a particular location, and so forth.

In various example embodiments, one or more portions of the network 1532 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1532 or a portion of the network 1532 may include a wireless or cellular network and the coupling 1524 may be a Code Division Multiple Access (CDMA) connection, a Global System for Mobile communications (GSM) connection, or another type of cellular or wireless coupling. In this example, the coupling 1524 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1510 may be transmitted or received over the network 1532 using a transmission medium via a network interface device (e.g., a network interface component included in the communication components 1540) and utilizing any one of a number of well-known transfer protocols (e.g., hypertext transfer protocol (HTTP)). Similarly, the instructions 1510 may be transmitted or received using a transmission medium via the coupling 1522 (e.g., a peer-to-peer coupling) to the devices 1520. The term "transmission medium" shall be taken to include any intangible medium that is capable of storing, encoding, or carrying the instructions 1510 for execution by the machine 1500, and includes digital or analog communications signals or other intangible media to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
    receiving at a job search engine of a social networking service a job search request associated with a member of the social networking service;
    responsive to receiving the job search request associated with the member, processing the job search request to obtain a plurality of candidate job postings and a plurality of job affinity scores from one or more databases storing job postings and job affinity scores, each job affinity score associated with a candidate job posting and indicating for the respective candidate job posting a measure of degree to which a member profile of the member includes attributes that match or otherwise correspond with attributes of the respective candidate job posting;
    for each group of a plurality of pre-defined groups for grouping job postings based on some pre-defined characteristic:
        deriving a group affinity score for the group based at least in part on a number of historical interactions the member has had with job postings previously assigned to the group when previously presented to the member via one or more user interfaces of the social networking service, the group affinity score for each group representing a measure of relevance of the group to the member;
        deriving a global affinity score for the group based at least in part on a number of historical interactions all members of the social networking service have had with job postings previously assigned to the group when previously presented via one or more user interfaces of the social networking service, the global affinity score for the group representing a measure of relevance of the group to all members of the social networking service;
    for each candidate job posting in the plurality of candidate job postings:
        for each group of the plurality of pre-defined groups for grouping job postings based on some pre-defined characteristic, deriving for the candidate job posting a job-to-group score representing a measure of the degree to which the job posting has attributes associated with the pre-defined characteristic of the group in the plurality of pre-defined groups for grouping job postings;

assigning the candidate job posting to one group of the plurality of pre-defined groups for grouping job postings based on some pre-defined characteristic for which the job-to-group score for the candidate job posting and group is highest; and deriving a combined affinity score for the candidate job posting as a function of i) the job affinity score of the respective candidate job posting, ii) the job-to-group score for the group to which the candidate job posting has been assigned, iii) the group affinity score of the group to which the candidate job posting has been assigned, and iv) the global affinity score of the group to which the candidate job posting has been assigned; and presenting in a user interface some subset of groups of candidate job postings, wherein the groups within the subset of groups of candidate job postings are presented in order of their respective group affinity scores, and the candidate job postings assigned to a group are presented in order of their respective combined affinity scores.

2. The computer-implemented method of claim 1, wherein assigning the candidate job posting to one group of the plurality of pre-defined groups for grouping job postings based on some pre-defined characteristic for which the job-to-group score for the candidate job posting and group is highest includes assigning the candidate job posting to the one group only when the job-to-group score for the candidate job posting and group exceeds some predetermined threshold score for the group.

3. The computer-implemented method of claim 1, wherein deriving the group affinity score for the group includes deriving the group affinity score at least in part based on the number of candidate job postings assigned to the group having a job-to-group score exceeding a predetermined job-to-group threshold score for the group.

4. The computer-implemented method of claim 1, wherein deriving the group affinity score for the group includes deriving the group affinity score at least in part based on the number of candidate job postings assigned to the group.

5. The computer-implemented method of claim 1, wherein deriving the group affinity score for the group includes using a machine learned model that has been trained using training data indicating historical interactions of all members of the social networking service with job postings previously assigned to the group.

6. A system comprising:
at least one processor for executing instructions stored in memory; and
a memory storing instructions that, when executed by the at least one processor, cause the system to perform operations comprising:
receiving at a job search engine of a social networking service a job search request associated with a member of the social networking service;
responsive to receiving the job search request associated with the member, processing the job search request to obtain a plurality of candidate job postings and a plurality of job affinity scores from one or more databases storing job postings and job affinity scores, each job affinity score being associated with a candidate job posting and indicating for the respective candidate job posting a measure of degree to which a member profile of the member includes attributes that match or otherwise correspond with attributes of the respective candidate job posting;

for each group of a plurality of pre-defined groups for grouping job postings based on some pre-defined characteristic:
deriving a group affinity score for the group based at least in part on a number of historical interactions the member has had with job postings previously assigned to the group when previously presented to the member via one or more user interfaces of the social networking service, the group affinity score for each group representing a measure of relevance of the group to the member;
deriving a global affinity score for the group based at least in part on a number of historical interactions all members of the social networking service have had with job postings previously assigned to the group when previously presented via one or more user interfaces of the social networking service, the global affinity score for the group representing a measure of relevance of the group to all members of the social networking service;

for each candidate job posting in the plurality of candidate job postings:
for each group of the plurality of pre-defined groups for grouping job postings based on some pre-defined characteristic, deriving for the candidate job posting a job-to-group score representing a measure of the degree to which the job posting has attributes associated with the pre-defined characteristic of the group in the plurality of pre-defined groups for grouping job postings;
assigning the candidate job posting to one group of the plurality of pre-defined groups for grouping job postings based on some pre-defined characteristic for which the job-to-group score for the candidate job posting and group is highest; and
deriving a combined affinity score for the candidate job posting as a function of i) the job affinity score of the respective candidate job posting, ii) the job-to-group score for the group to which the candidate job posting has been assigned, iii) the group affinity score of the group to which the candidate job posting has been assigned, and iv) the global affinity score of the group to which the candidate job posting has been assigned; and presenting in a user interface some subset of groups of candidate job postings, wherein the groups within the subset of groups of candidate job postings are presented in order of their respective group affinity scores, and the candidate job postings assigned to a group are presented in order of their respective combined affinity scores.

7. The system of claim 6, wherein assigning the candidate job posting to one group of the plurality of pre-defined groups for grouping job postings based on some pre-defined characteristic for which the job-to-group score for the candidate job posting and group is highest includes assigning the candidate job posting to the one group only when the job-to-group score for the candidate job posting and group exceeds some predetermined threshold score for the group.

8. The system of claim 6, wherein deriving the group affinity score for the group includes deriving the group affinity score at least in part based on the number of candidate job postings assigned to the group having a job-to-group score exceeding a predetermined job-to-group threshold score for the group.

9. The system of claim 6, wherein deriving the group affinity score for the group includes deriving the group affinity score at least in part based on the number of candidate job postings assigned to the group.

10. The system of claim 6, wherein deriving the group affinity score for the group includes using a machine learned model that has been trained using training data indicating historical interactions of all members of the social networking service with job postings previously assigned to the group.

* * * * *

UNITED STATES PATENT AND TRADEMARK OFFICE
CERTIFICATE OF CORRECTION

PATENT NO. : 10,679,187 B2
APPLICATION NO. : 15/419174
DATED : June 9, 2020
INVENTOR(S) : Kenthapadi et al.

Page 1 of 1

It is certified that error appears in the above-identified patent and that said Letters Patent is hereby corrected as shown below:

On the Title Page

In Column 2, item (56) under "Other Publications", Line 1, delete "arid" and insert --and-- therefor Signed and Sealed this
Fifteenth Day of September, 2020

Andrei Iancu
*Director of the United States Patent and Trademark Office*